US012626368B2

(12) United States Patent
Buczkowski et al.

(10) Patent No.: US 12,626,368 B2
(45) Date of Patent: May 12, 2026

(54) IMAGE ANALYSIS FOR AERIAL IMAGES

(71) Applicant: AI CLEARING INC., Austin, TX (US)

(72) Inventors: Aleksander Buczkowski, Warsaw (PL);
Michal Mazur, Warsaw (PL); **Adam
Wisniewski, Warsaw (PL); Dariusz
Ciesla**, Warsaw (PL)

(73) Assignee: AI CLEARING INC., Austin, TX (US)

( * ) Notice: Subject to any disclaimer, the term of this
patent is extended or adjusted under 35
U.S.C. 154(b) by 304 days.

(21) Appl. No.: 18/253,120

(22) PCT Filed: Nov. 16, 2021

(86) PCT No.: PCT/US2021/059493

§ 371 (c)(1),
(2) Date: May 16, 2023

(87) PCT Pub. No.: WO2022/104251

PCT Pub. Date: May 19, 2022

(65) Prior Publication Data

US 2023/0419501 A1 Dec. 28, 2023

(30) Foreign Application Priority Data

Nov. 16, 2020 (EP) ..................................... 20207918
Nov. 16, 2020 (EP) ..................................... 20207919

(51) Int. Cl.
*G06T 7/149* (2017.01)
*G06T 7/11* (2017.01)
(Continued)

(52) U.S. Cl.
CPC ................ *G06T 7/149* (2017.01); *G06T 7/11*
(2017.01); *G06T 7/174* (2017.01); *G06T 7/75*
(2017.01);
(Continued)

(58) Field of Classification Search
CPC . G06T 7/149; G06T 7/11; G06T 7/174; G06T
7/75; G06T 17/05;
(Continued)

(56) References Cited

U.S. PATENT DOCUMENTS 9,245,201 B1 1/2016 Jin et al.
9,389,084 B1 7/2016 Chen
(Continued)

OTHER PUBLICATIONS

Billen, et al. "3D spatial relationships model: a useful concept for
3D cadastre?" (2003) Computers, Environment and Urban Systems,
vol. 27(4), pp. 411-425 doi:10.1016/s0198-9715(02)00040-6.
(Continued)

*Primary Examiner* — Jianxun Yang
(74) *Attorney, Agent, or Firm* — Tarolli, Sundheim,
Covell & Tummino LLP

(57) ABSTRACT

Disclosed is a system comprising a data-processing system.
The data-processing system comprises a data-storage com-
ponent, a segmentation component and a projection com-
ponent. The data-storage component is configured for pro-
viding an input orthophoto map of an area and an input
digital elevation model of the area. The segmentation com-
ponent is configured for performing a segmentation step, the
segmentation step comprises generating at least one or a
plurality of polygon(s) based on the input orthophoto map.
Each polygon approximates a part of the input orthophoto
map. The projection component is configured for perform-
ing a projection step and the projection step comprises
projecting the polygon(s) on the input digital elevation
model of the area. The projection component is further
configured for performing a reference surface generation
step, the reference surface generation step comprising gen-
erating a reference surface for each of at least some of the
polygon(s). Further, a corresponding method and a corre-
sponding computer-program product are disclosed.

13 Claims, 16 Drawing Sheets

(51) Int. Cl.

| | |
|---|---|
| *G06T 7/174* | (2017.01) |
| *G06T 7/73* | (2017.01) |
| *G06T 17/05* | (2011.01) |
| *G06V 10/776* | (2022.01) |
| *G06V 10/82* | (2022.01) |
| *G06V 20/17* | (2022.01) |

(52) U.S. Cl.
CPC ............ *G06T 17/05* (2013.01); *G06V 10/776* (2022.01); *G06V 10/82* (2022.01); *G06V 20/17* (2022.01); *G06T 2207/10032* (2013.01); *G06T 2207/20021* (2013.01); *G06T 2207/20081* (2013.01); *G06T 2207/20084* (2013.01)

(58) Field of Classification Search
CPC . G06T 2207/10032; G06T 2207/20021; G06T 2207/20081; G06T 2207/20084; G06T 2207/30181; G06T 7/337; G06V 10/776; G06V 10/82; G06V 20/17
See application file for complete search history.

(56) References Cited

U.S. PATENT DOCUMENTS

| | | | |
|---|---|---|---|
| 10,339,663 B2 | 7/2019 | Barajas Hernandez | |
| 10,593,108 B2 | 3/2020 | Barajas Hernandez | |
| 2002/0082942 A1* | 6/2002 | Shimazu | G06T 17/05 |
| | | | 705/27.2 |
| 2005/0031197 A1 | 2/2005 | Knopp | |
| 2011/0033110 A1* | 2/2011 | Shimamura | G06T 7/55 |
| | | | 382/173 |
| 2021/0150230 A1* | 5/2021 | Smolyanskiy | G06V 10/82 |
| 2021/0304514 A1 | 9/2021 | Croxford et al. | |

OTHER PUBLICATIONS

Vu, et al. "A Hybrid Neural Network for Graph-Based Human Pose Estimation From 2D Images" (2020) IEEE Access, vol. 8, pp. 52830-52840 doi:10.1109/access.2020.2980565.

Xiong, et al. "An End-To-End Bayesian Segmentation Network Based on a Generative Adversarial Network for Remote Sensing Images" (2020) Remote Sensing, vol. 12, 216 doi:10.3390/rs12020216.

Peng, et al. "An Improved GrabCut Method Based on a Visual Attention Model for Rare-Earth Ore Mining Area Recognition with High-Resolution Remote Sensing Images", (2019) Remote Sensing, vol. 11,987 doi:10.3390/rs11080987.

Ahmadi, et al. "An Integrated Photogrammetric and Spatial Database Management System for Producing Fully Structured Data Using Aerial and Remote Sensing Images" (2009) Sensors, vol. 9(4), pp. 2320-2333 doi:10.3390/s90402320.

Huang, et al. "Automatic Mapping of Thermokarst Landforms from Remote Sensing Images Using Deep Learning: A Case Study in the Northeastern Tibetan Plateau" (2018) Remote Sensing, vol. 10, 2067 doi:10.3390/rs10122067.

Bokhovkin, et al. "Boundary Loss for Remote Sensing Imagery Semantic Segmentation" (2019) Advances in Neural Networks.

Maggiori, et al. "Can semantic labeling methods generalize to any city? the inria aerial image labeling benchmark" (2017) IEEE International Geoscience and Remote Sensing Symposium (IGARSS) doi:10.1109/igarss.2017.8127684.

"QGIS A Free Open Source Geographic Information System" https://qgis.org/en/site/.

"Occupation Employment and Wage Statistics" US Bureaus of Labor Statistics, https://www.bls.gov/oes/.

International Search Report dated Mar. 10, 2022 for corresponding International Application No. PCT/US2021/059493.

Krausse et al., "Extracting Orthogonal Building Objects in Urban Areas from High Resolution Stereo Satellite Image Pairs", (Sep. 1, 2007) pp. 1-6 http://elib.dlr.de/52632/1/krauss-PIA.pdf.

Reinzartz, et al., "Advances in DSM Generation and Higher Level Information Extraction from High Resolution Optical Stereo Satellite Data" Earsel Special Interest Group: 3D Remote Sensing & Urban Remote Sensing, (Jan. 1, 2014), pp. 1-9 https://elib.dlr.de/89701/1/Reinartz_3D-Earsel-SIG-3D-paper.pdf.

Giordan, et al., "The use of unmanned aerial vehicles (UAVs) for engineering geology applications", Bulletin of Engineering Geology and The Environment, vol. 79, No. 7 (Apr. 1, 2020), pp. 3437-3481 doi:10.1007/s10064-020-01766-2.

Cheng, et al. "Remote Sensing Image Scene Classification Meets Deep Learning: Challenges, Methods, Benchmarks, and Opportunities", IEEE Journal of Selected Topics in Applied Earth Observations and Remote Sensing, (Jun. 25, 2020), vol. 13, pp. 3735-3756 doi:10.1109/jstars.2020.3005403.

Pang, et al. (2016), "SGM-based seamline determination for urban orthophoto mosaicking" ISPRS Journal of Photogrammetry and Remote Sensing, 112, 1-12, (2016) doi:10.1016/j.isprsjprs.2015.11.0.

Xiang, et al. (2019). "Mini-Unmanned Aerial Vehicle-Based Remote Sensing: Techniques, applications, and prospects" IEEE Geoscience and Remote Sensing Magazine, vol. 7(3), pp. 29-63 doi:10.1109/mgrs.2019.2918840.

Hu, et al. "Classification of Very High-Resolution Remote Sensing Imagery Using a Fully Convolutional Network With Global and Local Context Information Enhancements" IEEE Access, vol. 8, pp. 14606-14619 (2020) doi.10.1109/ACCESS.2020.2964760.

"CS231n Colvolutional Neural Networks for Visual Recognition" Convolutional Neural Networks (CNNs/ConvNets) (2023), 23 pages https://cs231n.github.io/convolutional-networks/.

"CS231n Colvolutional Neural Networks for Visual Recognition:Introduction" Course website (2023), 12 pages https://cs231n.github.io/optimization-2/.

"CS231n Colvolutional Neural Networks for Visual Recognition:Learning" Course website (2023), 19 pages https://cs231n.github.io/neural-networks-3/.

Dos Santos, et al., "Deep Convolutional Neural Networks for Sentiment Analysis of Short Texts" (2014) Proceedings of COLING 2014, the 25th International Conference on Computational Linguistics: Technical Papers, pp. 69-78.

Buda, et al. "Deep Learning-Based Segementation of Nodules in Thyroid Ultrasound: Improving Performance by Utilizing Markers Present in the Images", Science Direct, Ultrasound in Medicine & Biology, (2020). vol. 46, issue 2, pp. 415-421.

Liu, et al. "Dense Dilated Convolutions Merging Network for Land Cover Classification" IEEE Transactions on Geoscience and Remote Sensing, (2020), 11 pages.

Bhatnagar, et al. "Drone Image Segmentation Using Machine and Deep Learning for Mapping Raised Bog Vegetation Communities", Remote Sensing (2020) vol. 12, 2602, 26 pages doi:10.3390/rs12162602.

Liu, et al., Efficient Patch-Wise Semantic Segmentation for Large Scale Remote Sensing Images, Sensors (2018) vol. 18(10), 3232, 36 pages.

Yang, et al., "End-to-End Learning of Deformable Mixture of Parts and Deep Convolutional Neural Networks for Human Pose Estimation" (2016) IEEE Conference on Computer Vision and Pattern Recognition (CVPR), 10 pages doi:10.1109/cvpr.2016.335.

ESRI Shapefile Technical Description, ESRI White Paper (Jul. 1998), 35 pages.

Zhou, et al., "Estimating Maize-Leaf Coverage in Field Conditions by Applying a Machine Learning Algorithm to UAV Remote Sensing Images", Applied Sciences (2019) vol. 9.2389, 18 pages doi:10.3390/app9112389.

Singh, et al., "EvalNorm: Estimating Batch Normalization Statistics for Evaluation" (2019) IEEE/CVF International Conference on Computer Vision (ICCV) 10.1109/iccv.2019.00373.

Poirson, et al., "Fast Single Shot Detection and Pose Estimation" (2016) Fourth International Conference on 3D Vision (3DV) doi:10.1109/3dv.2016.78.

(56)                References Cited

OTHER PUBLICATIONS

Ren, et al., "Faster R-CNN: Towards Real-Time Object Detection with Region Proposal Networks", (2017) IEEE Transactions on Pattern Analysis and Machine Intelligence, 39(6), pp. 1137-1149 doi:10.1109/tpami.2016.2577031.

Reiterer, et al. (2020). Fully Automated Segmentation of 2D and 3D Mobile Mapping Data for Reliable Modeling of Surface Structures Using Deep Learning. Remote Sensing, vol. 12(16), 2530 doi:10. 3390/rs12162530.

Shelhamer, et al., "Fully Convolutional Networks for Semantic Segmentation" (2017) IEEE Transactions on Pattern Analysis and Machine Intelligence, vol. 39(4), pp. 640-651 doi:10.1109/tpami. 2016.2572683.

Chen, et al., "Fully Convolutional Neural Network with Augmented Atrous Spatial Pyramid Pool and Fully Connected Fusion Path for High Resolution Remote Sensing Image Segmentation" (2019) Applied Sciences vol. 9.9, 1816 doi:10.3390/app9091816.

Dang, et al., "Fusarium Wilt of Radish Detection Using RGB and Near Infrared Images from Unmanned Aerial Vehicles", (2020) Remote Sensing vol. 12.17, 2863 doi:10.3390/rs12172863.

Krizhevsky, et al., "ImageNet classification with deep convolutional neural networks" (2017) Communications of the ACM, vol. 60(6), pp. 84-90 doi:10.1145/3065386.

Mazzia, et al., "Improvement in Land Cover and Crop Classification based on Temporal Features Learning from Sentinel-2 Data Using Recurrent-Convolutional Neural Network (R-CNN)". (2019) Applied Sciences, vol. 10(1), 238, 23 pages doi:10.3390/app10010238.

"OpenGIS Web Map Tile Service Implementation Standard", OGC Making Location Count, (2021) https://www.ogc.org/standards/wmts.

Everingham, et al. "The 2005 PASCAL Visual Object Classes Challenge", First PASCAL Machine Learning Challenges Workshop (MLCW '05), (Apr. 2005), Southampton, United Kingdom. pp.117-176, doi.10.1007/11736790_8.

Paszke, et al. "PyTorch: An Imperative Style, High-Performance Deep Learning Library" (2019) 33rd Conference on Neural Information Processing Systems, 12 pages.

Chen, et al., "Rethinking Atrous Convolution for Semantic Image Segmentation" (2017) Google Inc. 14 pages.

Zoph, et al., "Rethinking Pre-training and Self-training" (2020) 34th Conference on Neural Information Processing Systems, 13 pages.

Lukic, et al., "Speaker identification and clustering using convolutional neural networks" (2016) IEEE 26th International Workshop on Machine Learning for Signal Processing (MLSP), 6 pages doi:10.1109/mlsp.2016.7738816.

Rottensteiner, et al., "The ISPRS Benchmark on Urban Object Classification and 3D Building Reconstruction" (2012) ISPRS Annals of the Photogrammetry, Remote Sensing and Spatial Information Sciences, vol. 1-3, XXII ISPRS Congress.

Ronneberger, et al., "U-Net: Convolutional Networks for Biomedical Image Segmentation" (2015) Medical Image Computing and Computer-Assisted Intervention—MICCAI 234-241 doi:10.1007/978-3-319-24574-4_28.

Redmon, et al., "You Only Look Once: Unified, Real-Time Object Detection" (2016) IEEE Conference on Computer Vision and Pattern Recognition (CVPR), 10 pages doi:10.1109/cvpr.2016.91.

International Search Report dated Mar. 10, 2022 for corresponding International Application No. PCT/US2021/059512.

* cited by examiner

0

DEM 50    50    50

48d

48c

48a

48b

IMAGE ANALYSIS FOR AERIAL IMAGES

RELATED APPLICATIONS

The present application is a U.S. National Stage application under 35 USC 371 of PCT Application Serial No. PCT/US2021/059493, filed on 16 Nov. 2021, which claims priority to EP Patent Application Serial No. 20207918.2, filed on 16 Nov. 2020, and EP Patent Application Serial No. 20207919.0, filed on 16 Nov. 2020, the entirety of each of which is incorporated herein by reference.

The present invention relates to the field of image analysis and particularly to the field of analysis of aerial images. The present invention further relates to determining types of surfaces, volumes and volume changes.

The concept of analysing areas by means of aerial images is generally known. It is also applied to imagery generated by unmanned aerial vehicles. Aerial images can for example be used for analysing construction sites, e.g. the progress of the work can be monitored.

Classically, the progress of construction sites as well as an adherence to plans, e.g. in terms of precise positions of structures etc, is monitored by land surveyors. Depending on the size of the construction site, the monitoring can only be performed at crucial points or at random, already due to the distances to cover, e.g. in case of highway construction sites.

In some cases, not the whole site can be analysed. Further, errors during the process of surveying cannot be completely excluded. Since survey results on construction sites are inter alia used as condition for authorizing payments, there may be a need for revisable and fast survey. For large construction sites, surveyors usually inspect only small sample of data, extrapolating findings for the whole site. This process may be prone to errors—both human errors (like selecting bad sample data, which is convenient to measure, but not representative) and errors due to extrapolation.

The analysis of the sites may be performed by cameras mounted to aerial vehicles, such as airplanes or drones. However, in this case, the resulting images need to be processed correspondingly. The further processing can for example be performed with computer-support.

U.S. Pat. No. 10,339,663 B2 discloses systems and methods for generating georeference information with respect to aerial images. In particular, in one or more embodiments, systems and methods generate georeference information relating to aerial images captured without ground control points based on existing aerial images. For example, systems and methods can access a new set of aerial images without ground control points and utilize existing aerial images containing ground control points to generate a georeferenced representation corresponding to the features of the new set of aerial images. Similarly, systems and methods can access a new image without ground control points and utilize an existing georeferenced orthomap to produce a georeferenced orthomap corresponding to the features of the new image. One or more embodiments of the disclosed systems and methods permit users to obtain georeference information related to new images without the need to place ground control points or collect additional georeference information.

U.S. Pat. No. 10,593,108 B2 discloses systems and methods for more efficiently and quickly utilizing digital aerial images to generate models of a site. In particular, in one or more embodiments, the disclosed systems and methods capture a plurality of digital aerial images of a site. Moreover, the disclosed systems and methods can cluster the plurality of digital aerial images based on a variety of factors, such as visual contents, capture position, or capture time of the digital aerial images. Moreover, the disclosed systems and methods can analyze the clusters independently (i.e., in parallel) to generate cluster models. Further, the disclosed systems and methods can merge the cluster models to generate a model of the site.

U.S. Pat. No. 9,389,084 B2 is directed toward systems and methods for identifying changes to a target site based on aerial images of the target site. For example, systems and methods described herein generate representations of the target site based on aerial photographs provided by an unmanned aerial vehicle. In one or more embodiments, systems and method described herein identify differences between the generated representations in order to detect changes that have occurred at the target site.

While the prior art approaches may be satisfactory in some regards, they have certain shortcomings and disadvantages. For example, objects must still be identified, e.g. on orthophoto maps or orthomosaics generated based on the aerial images.

After objects are detected, analysis as regards to position, surface, volume or the like is performed based on the orthophoto map and/or digital surface models (DSMs) or digital terrain models (DTMs).

It is therefore an object of the invention to overcome or at least alleviate the shortcomings and disadvantages of the prior art. More particularly, it is an object of the present invention to provide an improved method, system and computer program product for analysis of aerial images.

It is an optional object of the invention to provide a system and method for identifying objects in an area.

It is another optional object of the invention to provide a system and method for estimating volumes of objects in an area.

It is another optional object of the invention to provide a system and method for identifying objects in an area with an increased precision.

In a first embodiment, a system comprising a data-processing system is disclosed. The data-processing system is configured for providing an input orthophoto map (O) of an area and for providing an input digital elevation model (DEM) of the area. Further, the data processing system is configured for generating at least one or a plurality of polygon(s) based on the input orthophoto map. Each polygon approximates a part of the input orthophoto map (O).

In the following, the term "polygon(s)" will be used together with the plural form of a verb for reasons of clarity and conciseness. However, these statements are intended to also cover at least one polygon.

Further, the data-processing system is configured for projecting the polygon(s) on the input digital elevation model (DEM) of the area. The data-processing system is also configured for generating a reference surface for each of at least some of the polygon(s).

The disclosed system may be optionally advantageous, as it may allow for automated detection of objects in the area, and for reliably assigning their borders with elevation coordinates.

Further, this may optionally advantageous as it may allow for repeatable results for identical orthophoto maps and digital elevation models.

In this disclosure, the term "polygon" is intended to refer to a geometric shape comprising n vertexes and n edges, wherein the edges only intersect at the vertexes.

The person skilled in the art will easily understand that the polygon(s) which each approximate a part of the input orthophoto map (O) may in other words be linear ring(s) or closed polygonal chain(s), and that the polygon(s) may be indicated for example by one or more triangles forming a polygon. Thus, the polygon(s) may for example be described as at least one or a plurality of neighbouring triangles per polygon.

The term "object" is intended to refer to an object in the area. However, "object" may refer only to objects of interest, i.e. objects that are to be detected. For example, plain ground may not need to be detected or further classified. Objects that are no objects of interest may however be detected, e.g. as "background".

The objects may correspond to parts. The term "part" may to refer to a part of the area corresponding to an object or a portion thereof, e.g. when only a portion of an object is within the area, or when only a section of the area is processed or photographed, which section only comprises a portion of an object. The term "part" may also refer to a portion of an orthophoto map or a digital elevation model, which portion corresponds to an object in the area.

The term "volume" is intended to refer to a solid, i.e. to a three-dimensional body, in other words a shape. A volume corresponding to an object may be a volume approximating a geometry of the object. In case that the object is an excavation, depression, hole or the like, the volume may thus also be a shape between a surface of the object and the former surface, e.g. a ground surface.

The term "reference surface" of an object is intended to refer to a surface limiting the volume corresponding to the object, wherein the surface is not directly present in a DEM, such as a lower surface of an object places on the ground, e.g. a heap, construction material or a vehicle. Another example for such a surface that is not directly present in said DEM may be a former ground surface of the excavation, depression, hole or the like, as discussed above.

Whenever x-, y- and/or z-coordinates or directions are used within this disclosure, the z-direction may be vertical, in other words orthogonal to a ground surface. The x- and y-directions may be orthogonal to each other and to the z-direction, i.e. they may be horizontal directions. The coordinates may form a Cartesian coordinate system.

The orthophoto map may also be referred to as orthomosaic or orthophoto. The orthophoto map may be generated based on one or more aerial images by means of photogrammetry. In other words, the orthophoto map may be generated by orthorectifying the one or more aerial images.

The digital elevation model (DEM) may be at least one of a digital surface model (DSM) and a digital terrain model (DTM).

The data-processing system may comprise a data-storage component.

The data-storage component may be configured for providing at least one of image data and elevation data.

The data-storage component may be configured for providing the input orthophoto map (O) the input digital elevation model (DEM) of the area.

The data-processing system may comprise a segmentation component. The segmentation component may be configured for generating the polygon(s) based on the input orthophoto map, wherein each polygon approximates a part of the input orthophoto map (O).

The data-processing system may comprise a projection component. The projection component may be configured for projecting the polygon(s) on the input digital elevation model (DEM) of the area and for generating the reference surface for each of the at least some of the polygon(s).

The data-processing system, particularly the projection component, may be configured for determining for each vertex of the polygon(s) at least one coordinate corresponding to the projection of vertexes on the input digital elevation model (DEM), such as elevation coordinates of the vertexes. The projection component may be configured for the determining for example by extracting elevation coordinates corresponding to positions of the vertexes from the digital elevation model (DEM).

The data-processing system may be configured for determining for each reference surface a volume between a portion of the input digital elevation model (DEM) and a portion of the reference surface or the reference surface. The data-processing system may be configured for indicating the volume by a scalar indication. The volume may for example be indicated as set of cuboids or as a volume limited by a network of triangles.

This may be optionally advantageous, as it may allow to assess volumes of the area without further human interaction and thus optionally allow for analysis of 100% of the area or a defined section thereof.

The data-processing system may comprise a volume determining component. The volume determining component may be configured for determining for each reference surface the volume between the portion of the input digital elevation model (DEM) and the portion of the reference surface or the reference surface.

The portion of the reference surface may be a portion of the reference surface within the corresponding polygon. The portion of the input digital elevation model (DEM) may be a portion of the input digital elevation model (DEM) within said polygon.

The reference surface may be a surface approximating an object corresponding to a part of the orthophoto map (O) on side opposite to a surface of the object modelled by the digital elevation model (DEM). As discussed above, this may for example be a ground surface of a heap or under a truck, or a former ground surface in case of an excavation.

The reference surface may be a plane.

The reference surface may be a horizontal plane, in other words, a plane comprising a constant elevation coordinate.

However, the reference surface may also be of another shape than a plane.

The data-processing system, particularly the projection component, may be configured for processing elevation coordinates of the vertexes of the at least some polygon(s) projected to the input digital elevation model (DEM). E.g. in case of a street in uneven terrain, the projection component may be configured for modelling a lower side of a street material.

Processing the elevation coordinates of the vertexes may comprise generating a statistic measure of the elevation coordinates, such as a minimum, a maximum, a mean or a median of the elevation coordinates. The projection component may be configured for generating the statistic measure.

The data-processing system, particularly the projection component, may be configured for thus obtaining processed polygon(s). In other words, the polygon(s) comprising the elevation coordinates corresponding to a projection of the polygon(s) on the respective reference surface may be processed polygon(s).

The data-processing system, preferably the projection component, may be configured for generating the reference surface based on a prior digital elevation model. In other words, the data-processing system and/or the projection component may be configured for generating the reference surface based on a digital elevation model based on data that were sampled prior to the data based on which the input digital elevation model was generated. For example, in case of an excavation, a digital elevation model that was generated before the excavation works started may be used for a reference surface of the excavation. This may be optionally advantageous as it may allow for more precise and/or reliable reference surfaces.

The data-processing system may be configured for generating the polygon(s) based on the input orthophoto map (O) and the input digital elevation model (DEM).

The wherein the data-processing system may be configured for providing at least one point cloud relating to at least a portion of the area. A point cloud may comprise a plurality of points, each point comprising three-dimensional coordinates, such as x, y, z coordinates. The point cloud may particularly refer to the surface of the area.

The data-processing system, particularly the projection component, may be configured for determining at least one of the coordinate(s) corresponding to the projection of vertexes on the input digital elevation model (DEM) using the at least one point cloud. For example, the point cloud may be used for increasing a precision of the elevation coordinate of at least one of the vertexes.

This may be optionally advantageous in cases where the area locally comprises high elevation gradients, for example around trenches or holes.

The data-processing system may comprise a pre-processing component.

The data-processing system, particularly the pre-processing component, may be configured for determining at least a component of a gradient of the input digital elevation model (DEM), for example $$\frac{dh(x, y)}{dx},$$

wherein h(x,y) denotes an elevation, in other words a z-coordinate, of the DEM at (x,y). The gradient may for example also be a difference quotient, such as $\Delta h/\Delta x$, or a difference between neighbouring portions $\Delta h_{x1,x2}$.

The data-processing system, particularly the pre-processing component, may be configured for determining at least two components of the gradient of the input digital elevation model (DEM), for example $$\frac{dh(x, y)}{dx} \text{ and } \frac{dh(x, y)}{dy}.$$

The data-processing system, particularly the pre-processing component, may be configured for generating tiles of the input orthophoto map (O) and the digital elevation model (DEM). A tile may be a section, e.g. a rectangular section, of the input orthophoto map (O) or the digital elevation model (DEM), particularly in a horizontal direction. In other words, each tile may refer to a section of the area without being further restricted in the vertical direction. For further details, refer e.g. to the OpenGIS Web Map Tile Service Implementation Standard, available at https://www.ogc.org/standards/wmts.

The tiles may be overlapping in at least one direction, e.g. in the x- or in the y-direction.

The tiles may be overlapping in two directions, e.g. in the x- and in the y-direction.

The data-processing system, particularly the segmentation component, may be configured for determining the parts of the orthophoto map (O) by means of at least one convolutional neural network. In other words, the data-processing system, particularly the segmentation component, may comprise at least one convolutional neural network configured for determining the parts of the orthophoto map (O).

Convolutional neural networks may comprise convolutional layers. In some cases, the convolutional layers may be computed by convolution of weights of neurons of the convolutional neural network over each input channel, also referred to as "depth slice". A set of weights of neurons of a convolutional layer is sometimes referred to as "filter".

As known in the art, the weights of the neural networks may be determined by training in order to minimize a loss function. The loss function in general terms may be an indicator for a divergence between labels or results generated by the network and correct data, e.g. labelled training data.

Further details relating to convolutional neural networks are for example discussed in "*Convolutional Neural Networks (CNNs/ConvNets)*", available at https://cs231n.github.io/convolutional-networks/(retrieved on 09.11.2020). This disclosure is incorporated herein by reference in its entirety.

For training convolutional neural networks, it is common to use backpropagation, as known in the art. Further details relating to backpropagation are for example discussed in "CS231n Convolutional Neural Networks for Visual Recognition—Introduction", available at https://cs231n.github.io/optimization-2/and "CS231n Convolutional Neural Networks for Visual Recognition—Learning", available at https://cs231n.github.io/neural-networks-3/ (both retrieved on Sep. 11, 2020). These disclosures are incorporated herein by reference in their entirety.

The filters of convolutional neural networks may be trained, i.e. they "learn" the data automatically. Thus, a higher complexity and dimensionality is enabled.

Using a convolutional neural network may be optionally advantageous, as convolutional neural networks may be spatially invariant.

The data-processing system, particularly the segmentation component, may be configured for determining the parts of the input orthophoto map (O) by means of at least one convolutional neural network based at least on the input orthophoto map (O) and the component(s) of the gradient of the input digital elevation model (DEM).

The data-processing system, particularly the segmentation component, may be configured for assigning different classes to different portions of the orthophoto map (O) by the at least one convolutional neural network. The portions may for example be pixels or voxels. They may however also comprise a plurality of pixels or be differently defined, e.g. as patches of 10×10 pixels or as portions of the area.

The data-processing system, particularly the segmentation component, may be configured for assigning portions comprising same classes to groups. For example, portions comprising a class "asphalt" may be assigned to at least one or a plurality of groups. The portions may be assigned to at most one or to at least one group respectively.

Assigning the portions comprising same classes to groups may be assigning connected portions comprising same classes to groups. In other words, groups may be composed of connected portions comprising same classes. "Connected" is intended to refer to neighbouring portions, as well as to portions connected to portions of a same class by portions comprising said same class.

Each group may correspond to a part of the orthophoto map (O).

The data-processing system, particularly the segmentation component, may be configured for may be configured for processing at least some of the tiles individually. This may be optionally advantageous, as it may allow the system to process orthophoto maps and/or digital elevation models that could not be processed as whole due to memory limitations.

The data-processing system, particularly the segmentation component, may be configured for merging results from processing of the tiles.

The data-processing system, particularly the segmentation component, may be configured for merging the classes assigned to same portions in different tiles by a merging operator. The merging operator may for example comprise a maximum operator, such as a point-wise or portion-wise maximum-operator.

The classes assigned to portions of the tiles within a pre-defined distance to a border of the respective tile may not be considered in the merging operator. Additionally or alternatively, the classes assigned to portions of the tiles within a pre-defined distance to a border of the respective tile may be weighted lower in the merging operator.

In other words, the data-processing system, particularly the segmentation component, may be configured for are not considering and/or weighting lower the classes assigned to portions of the tiles within a pre-defined distance to a border of the respective tile in the merging operator.

This may be optionally advantageous so as to compensate for a lack of context, i.e. neighbouring objects, provided to the convolutional neural network next to borders of the tiles. The convolutional neural network may generate less reliable estimations in said portions. Thus, it may be optionally advantageous to use data generated for another tile, where a same geographical point is farer away from a border of said other tile and the convolutional neural network can thus access more context.

The data-processing system, particularly the segmentation component, may be configured for rotating at least some tiles, processing the rotated and the original tiles by means of the at least one convolutional network, for the result(s) corresponding to the rotated tiles, inverting the rotation, and for each of the at least some tiles, merging the result of the original and the rotated tile.

The rotation may be at least one rotation. The rotation may comprise a plurality of rotations, e.g. around 90°, 180° and 270°.

Rotating the tiles and processing the tiles for each rotation may be optionally advantageous, as it provides more data for the convolutional neural network for assessment and may thus reduce an amount of non-detected classes or portions for which the class was not detected.

Rotating the tiles around 90° and/or multiples thereof may be optionally advantageous, as it may be implemented in a particularly resource efficient manner, e.g. by reordering pixels of an image, but without invoking multiplications or evaluations of cos- or sin-function.

The convolutional neural network may be trained with tiles comprising a lower resolution than the tiles processed by the data-processing system, particularly by the segmentation component. For example, the convolutional neural network may be obtained by training with tiles comprising image data corresponding to a bigger section of the area but a same number of pixels in comparison to the tiles processed by the semantic segmentation component.

In other words, the convolutional neural network may be trained with tiles comprising data corresponding to a bigger section of the area than the tiles processed in by the segmentation component (or the data-processing system), but however a same amount of data.

This may be optionally advantageous so as to train the convolutional neural network with more context and larger batches. The latter may optionally result in better approximations by batch normalization layers. The former may optionally result in better recognition of context-dependent objects. Both allow for better training results under a constraint of a limited amount of storage or allow for reduced use of memory.

The data-processing system may comprise a post-processing component.

The data-processing system, particularly the post-processing component, may be configured for discarding groups comprising an extent below a threshold.

The threshold may be pre-defined. The threshold may be specific to a class, so that there may be different thresholds for different classes. The data-processing system, particularly the post-processing component, may be configured for determining the threshold. The extent may be an extent of the horizontal surface corresponding to the respective group, but it may also be a number of pixels or portions of the orthophoto map and/or the digital elevation model corresponding to the group.

This may be optionally advantageous to remove artifacts and wrong classifications, e.g. single pixels or small pixel groups that are significantly smaller than objects/classes to be detected and which may thus be artifacts. Thresholds specific to classes may be optionally advantageous, as objects of different classes may have different possible sizes. For example, a plausible extent of a (erected) lantern may be significantly smaller than a plausible extent of a dump truck.

The data-processing system, particularly the post-processing component, may be configured for assigning a first class to a connected plurality of portions to which no class is assigned, if the connected plurality is enclosed by connected portions to which the first class is assigned.

The person skilled in the art will easily understand that instead of no class, the assigned class can be the "background"-class, as discussed above. Also, instead of no class, a class may be assigned to a group below the pre-defined threshold.

This may be optionally advantageous for removing classification artifacts of the convolutional neural network within an object. In other words, this may mean "filling holes" in detected objects, particularly in cases where the holes, i.e. the connected plurality of the portions without an assigned class, are too small to correspond to an object or a background section in the area.

The data-processing system, particularly the post-processing component, may be configured for assigning the first class to the connected plurality of portions to which no class is assigned only if the connected plurality is enclosed by connected portions to which the first class is assigned and if the extent of the connected plurality is below the threshold.

The threshold may comprise the above-discussed features.

This may be optionally advantageous, as objects that are enclosed by other objects may still be correctly identified, such as parts of concrete pipes whose section faces upwards and who enclose ground, or background or a heap of material in the middle of a roundabout.

The data-processing system, particularly the post-processing component, may be configured for applying a conditional random fields algorithm to the borders of the groups. This may be optionally advantageous for removing artifacts, e.g. miss-classified portions of the orthophoto map (O) and/or the digital elevation model (DEM).

Each part of the orthophoto map (O) may correspond to an object in the area. Relating thereto, see also the above remarks.

The data-processing system, particularly the segmentation component, may be configured for determining the polygon(s) based on the determined groups. The determined groups may be the groups by the post-processing component. In other words, the segmentation component may be configured for converting the class data from a raster format, e.g. pixels to which the classes are assigned, to vector data, e.g. the polygons.

The conversion to the vector data may be optionally advantageous for further processing, e.g. as vector data can be scaled without precision loss, and as vector data can be easier processed by GIS-systems or systems configured for processing GIS-data formats.

The data-processing system, particularly the post-processing component, may be configured for removing excessive vertices of the polygon(s). In other words, the data-processing system and/or the post-processing component may be configured for cleaning, denoising and/or generalizing vertices generated by the convolutional neural network.

The data-processing system may be configured for assigning at least 15, preferably at least 25 and still more preferably at least 30 different classes. The segmentation component may be configured for assigning at least 15, preferably at least 25 and still more preferably at least 30 different classes.

The portions may correspond to a surface of the area of at most 40 cm$^2$, preferably at most 20 cm$^2$, and still more preferably at most 10 cm$^2$. The surface may also be a surface corresponding to a pixel.

The input orthophoto map may comprise a sampling distance between 20 cm-0.5 cm, preferably at most 10 cm-1 cm, and still more preferably between 5 cm and 1 cm.

The data-processing system, particularly the volume determining component, may be configured for determining for each reference surface a portion of the volume above the reference surface and a portion of the volume below the reference surface.

At least one of the portions of the volume may equal 0, e.g. the portion of the volume above the reference surface in case of the hole, the excavation or the depression or the portion of the volume below the reference surface in case of a heap of material or the like.

The data-processing system may be further configured for providing design data.

The design data may be geo-referenced design data. The design data may be CAD-data.

The data-storage component may be configured for providing the design data.

The data-processing system may comprise an area-comparison component.

The data-processing system may further be configured for processing the design data.

The input orthophoto map (O) and the input digital elevation model (DEM) may comprise geographic references.

The data-processing system, particularly the projection component, may be configured for determining geographical positions of the vertexes of each polygon, such as geographical coordinates of said vertexes. For example, the projection component may be configured for extracting the geographical positions of the vertexes from the digital elevation model (DEM).

The data-processing system, particularly the projection component, may be configured for determining geo-referenced 3D-coordinates of the vertexes of the polygon(s).

The data-processing system, particularly the area-comparison component, may be configured for comparing the polygon(s) and the design data.

The data-processing system, particularly the area-comparison component, may be configured for determining deviation(s) between the polygon(s) and the design data.

The data-processing system, particularly the area-comparison component, may be configured for comparing at least portions of the determined volume(s) to the design data.

The portions of the determined volume(s) may comprise at least one vertex per volume. For example, the portion may comprise an extremal point in a direction where another object is to be placed successively. This may be optionally advantageous as it may allow for fewer comparisons.

The portions of the determined volume(s) may comprise a two-dimensional shape, such as a polygon or a line.

The portions of the determined volume(s) may comprise a three-dimensional solid. For example, for each of at least some volume(s), a two-dimensional shape may be compared, and elevations of at least one or a plurality of points of the volume(s) may be compared.

The person skilled in the art will understand that one way to obtain said elevations may be deriving them from the digital elevation model (DEM). Another may be deducing them from the determined volume(s), in other words from the 3D-solids approximating the objects.

The data-processing system, particularly the area-comparison component, may be configured for generating reporting units based on the design data.

At least one or a plurality of the polygon(s) may correspond to a reporting unit, respectively. In other words, the polygon(s) may be corresponding to at least one or a plurality of the reporting units.

The reporting units may be at least one of 2D-sections of the area, i.e. areas, points, sections of lines in the area; 3D-volumes, i.e. three-dimensional solids; and 3D surfaces, i.e. surfaces that may comprise a non-planar geometry. The reporting units may for example be used for determining whether a certain production/construction step has been performed. Determining said information for separate units may be optionally advantageous e.g. for determining whether or when a subsequent step can be performed.

Generating the reporting units may comprise dividing at least one object represented by the design data into a plurality of reporting units spatially different from each other. For example, a road surface may be divided up into several section along and/or in parallel to a length of the (planned) road.

Generating the reporting units may comprise dividing at least one object represented by the design data into a plurality of reporting units, wherein at least some of the reporting units relate to different steps of a construction procedure. For example, in case of a highway earthworks, laying aggregate base and asphalt paving may be such steps.

The person skilled in the art will easily understand that, at a single point in time, to each of some reporting units, polygon(s) may correspond respectively. In other words, to each of the aforementioned some reporting units, one or more of the polygon(s) may correspond.

For each of the some reporting units, a respective group of corresponding polygon(s) may be different. However, some of the respective groups may comprise common elements, e.g. if a polygon overlaps with two reporting units. Generating the reporting units may comprise dividing at least one object represented by the design data into a plurality of reporting units, wherein at least some of the reporting units may relate to relate to different points in time of a construction process. In other words, the reporting units may relate to different times or scheduled parts of a construction procedure. For example, in case of a road modernization, removal of old asphalt may be scheduled prior to a new paving.

The reporting units may be spatial objects. In other words, each reporting unit may for example be an object selected from a point, a line, a polygon or a three-dimensional solid. For a discussion of spatial objects, refer e.g. to Billen, Roland & Zlatanova, Sisi. (2003). 3D Spatial Relationships Model: a Useful Concept for 3D Cadastre?. In: *Computers, Environment and Urban Systems.*

The data-processing system, particularly the area-comparison component, may be configured for comparing the reporting units to the determined volume(s). Thus, e.g., optionally advantageously, a progress or completion of earthworks or other steps involving movement of material may be determined.

Alternatively or additionally, the data-processing system, particularly the area-comparison component, may be configured for comparing the reporting units to the determined parts of the orthophoto map, particularly to the class of at least one determined group corresponding to a position of a respective reporting unit. In more simple words, a reporting unit may be compared to a class determined for a determined part of the area. Thus, optionally advantageously, e.g. a progress or completion of surface treatment, e.g. road surface construction.

The data-processing system, particularly the area-comparison component, is configured for comparing polygon(s) corresponding to at least one of the reporting units and the design data.

The data-processing system, particularly the area-comparison component, is configured for determining deviation (s) between polygon(s) corresponding to at least one of the reporting units and the design data.

Thus, optionally advantageously, a deviation from the design may be determined—e.g. detection of shifted piles position in case of solar farm construction. Further, optionally, this deviation may be determined specific to a certain step or stage of the construction, e.g. a step of setting the piles of the solar farm.

The data-processing system, particularly the area-comparison component, may be configured for updating the reporting units upon changes of the design data. This may optionally advantageous so as to provide an accurate state of the construction site and/or finished working steps in case of changes in a construction plan.

The data-processing system may be configured for providing a first orthophoto map (O1), a second orthophoto map (O2), a first digital elevation model (DEM1) and a second digital elevation model (DEM2).

The first and second orthophoto map (O1), (O2) may both relate at least to a part of the area. The first and second digital elevation model (DEM1), (DEM2) may both relate at least to a part of the area.

The first orthophoto map (O1) and the first digital elevation model (DEM1) may refer to a first point in time or a first time range. The second orthophoto map (O2) and the second digital elevation model (DEM2) may refer to a second point in time or a second time range. The first point in time or the first time range may be located in time before the second point in time or the second time range.

In case of time ranges, the temporal distance of the points in time or time ranges may be at least 12 hours, preferably at least one day. Thus, optionally, different states of the area before and after certain operations, e.g. steps of construction works, can be captured.

The first and second orthophoto map (O1), (O2) may be orthophoto maps of the area as the orthophoto map discussed above. They may however differ from these, e.g. in that they relate to the different points in time/ranges of time. The same may apply mutatis mutandis to the first and second digital elevation model (DEM1), (DEM2).

The data-storage component may be configured for providing the first orthophoto map (O1), the second orthophoto map (O2), the first and the second digital elevation model (DEM1), (DEM2).

The data-processing system may be configured for processing the first orthophoto map (O1) as input orthophoto map (O) and the first digital elevation model (DEM1) as input digital elevation model (DEM) as discussed above. The data-processing system may be configured for thus generating first polygon(s) and first reference surface(s).

Further, the data-processing system may be configured for processing the second orthophoto map (O2) as input orthophoto map (O) and the second digital elevation model (DEM2) as input digital elevation model (DEM) as discussed above. The data-processing system may be configured for thus generating second polygon(s) and second reference surface(s).

In other words, the data-processing system may be configured for processing the first orthophoto map and the first digital elevation model as well as the second orthophoto map and the second digital elevation map independently from each other, using any of the above-disclosed features of the data-processing system and/or any of its components.

This may optionally advantageously allow to approximate the area at two different points in time. Further, optionally, it may enable determining differences in the area between these points in time, as discussed in the following.

The segmentation component and the projection component may be configured for processing the first orthophoto map (O1) as input orthophoto map (O) and the first digital elevation model (DEM1) as input digital elevation model (DEM), as discussed above. The segmentation component may be configured for thus generating first polygon(s) and the projection component may be configured for thus generating first reference surface(s). Further, the segmentation component and the projection component may be configured for processing the second orthophoto map (O2) as input orthophoto map (O) and the second digital elevation model (DEM2) as input digital elevation model (DEM) as discussed above. The segmentation component may be configured for thus generating second polygon(s) and the projection component may be configured for thus generating second reference surface(s).

The data-processing system, particularly the volume determining component, may be configured for processing the first reference surface(s) and the first digital elevation model (DEM1) as discussed above and thus generating first volume(s).

The data-processing system, particularly the volume determining component, may further be configured for processing the second reference surface(s) and the second digital elevation model (DEM2) as discussed above and thus generating second volume(s).

The data-processing system, particularly the volume determining component, may be configured for comparing at least some of the first and second volume(s).

The data-processing system, particularly the volume determining component, may be configured for determining volume differences between at least some of the first and the second volume(s).

This may be optionally advantageous for determining changes to the volume(s), e.g. due to construction works, environmental influence, theft or the like.

The data-processing system, particularly the volume determining component, may be configured for determining volumes that are present in only one of the first and the second volume(s). In other words, the data-processing system, particularly the volume determining component, may be configured for determining volumes that are at least one of present in the first volume(s) and not present in the second volume(s) and present in the second volume(s) and not present first volume(s).

This may be optionally advantageous, as it may for example allow for detecting newly present or disappeared objects, e.g. vehicles that were moved on or off the area or changes due to performed construction works, such as filled holes, performed excavations or built structures.

The system may be configured for analysis of aerial images.

The data-processing system may be configured for receiving at least one of image data and elevation data from an aerial vehicle and/or a satellite.

The aerial vehicle may be an unmanned aerial vehicle.

The system may comprise the aerial vehicle, preferably the unmanned aerial vehicle. The aerial vehicle, preferably the unmanned aerial vehicle, is configured for generating at least one of the image data and the elevation data.

The area may comprise a construction site.

The orthophoto map may comprise RGB data. In the present disclosure, the term "RGB data" is intended to refer to data relating to colours in a human-visible spectrum. However, different representations of colour data, i.e. relating to a wavelength of light in the visible spectrum, are intended to be encompassed by the term "RGB data", too.

The orthophoto map may comprise infrared data. The infrared data may be data relating to an infrared emission/reflection of the scanned area.

The point cloud may be generated based on at least LIDAR-measurement. In other words, the point cloud may be generated using a LIDAR-sensor. LIDAR (Light Detection and Ranging) is a technology for sensing a distance of objects, obstacles or the like around a sensing unit by mean of laser radiation.

The LIDAR-measurement may be performed by a drone comprising a LIDAR-sensor.

In a second embodiment, a method is disclosed. Definitions, details and advantages discussed above in the context of the system may apply respectively.

The method comprises providing the input orthophoto map (O) of the area and providing the input digital elevation model (DEM) of the area. The method further comprises performing the segmentation step. The segmentation step comprises generating at least one or a plurality of polygon(s) based on the input orthophoto map, each polygon approximating a part of the input orthophoto map (O). The method further comprises performing the projection step. The projection step comprises projecting the polygon(s) on the input digital elevation model (DEM) of the area. Further, the method comprises performing the reference surface generation step. The reference surface generation step comprises generating a reference surface for each of at least some of the polygon(s).

The projection step may comprise determining for each vertex of the polygon(s) at least one coordinate corresponding to the projection of vertexes on the input digital elevation model (DEM), such as elevation coordinates of the vertexes.

The method may further comprise the volume determining step. The volume determining step may comprise for each reference surface determining a volume between a portion of the input digital elevation model (DEM) and a portion of the reference surface.

The portion of the reference surface may be a portion of the reference surface within the corresponding polygon. The portion of the input digital elevation model (DEM) may be a portion of the input digital elevation model (DEM) within said polygon.

The reference surface may be the plane.

The reference surface may be the surface approximating an object corresponding to a part of the orthophoto map (O) on the side opposite to a surface of the object modelled by the digital elevation model (DEM).

The reference surface may be a horizontal plane.

The reference surface generation step may comprise processing elevation coordinates of the vertexes of the at least some polygon(s) projected to the input digital elevation model (DEM).

Processing the elevation coordinates of the vertexes may comprise generating a statistic measure of the elevation coordinates, preferably a median of the elevation coordinates.

The reference surface generation step may comprise thus obtaining processed polygon(s). In other words, the reference surface generation step may comprise obtaining polygon(s) where the elevation coordinates of the vertexes are replaced by the processed coordinates and/or results of the processing of the elevation coordinates.

The reference surface generation step may comprise generating the reference surface based on a prior digital elevation model.

The segmentation step may comprise generating the polygon(s) based on the input orthophoto map (O) and the input digital elevation model (DEM).

The method may comprise providing at least one point cloud relating to at least a portion of the area.

The projection step may comprise determining at least one of the coordinate(s) corresponding to the projection of vertexes on the input digital elevation model (DEM) using the at least one point cloud.

The semantic segmentation step may comprise the pre-processing step.

The pre-processing step may comprise determining at least a component of a gradient of the input digital elevation model (DEM).

The pre-processing step may comprise determining at least two components of the gradient of the input digital elevation model (DEM).

The pre-processing step may comprise generating the tiles of the input orthophoto map (O) and the digital elevation model (DEM).

The tiles may be overlapping in at least one direction.

The tiles may be overlapping in two directions.

The segmentation step may comprise determining the parts of the orthophoto map (O) by means of the at least one convolutional neural network.

The segmentation step may comprise determining the parts of the input orthophoto map (O) by means of at least one convolutional neural network based at least on the input orthophoto map (O) and the component(s) of the gradient of the input digital elevation model (DEM).

The segmentation step may comprise assigning different classes to different portions of the orthophoto map (O) by the at least one convolutional neural network. The portions may for example be pixels or image portions of the predetermined size, such as 10×10 pixels, as discussed above.

The segmentation step may comprise assigning portions comprising same classes to groups.

Assigning the portions comprising same classes to groups may be assigning connected portions comprising same classes to groups.

Each group may correspond to a part of the orthophoto map (O).

The method may comprise processing at least some tiles individually by means of the at least one convolutional neural network.

The segmentation step may comprise merging the results from processing of the tiles.

The segmentation step may comprise merging the classes assigned to same portions in different tiles by the merging operator, as discussed in the context of the system.

The classes assigned to portions of the tiles within a pre-defined distance to a border of the respective tile may not considered. Alternatively or additionally, they may be weighted lower in the merging operator.

The semantic segmentation step may comprise for at least some tiles, rotating the tiles and processing the rotated and the original tiles by means of the at least one convolutional network. Further, the semantic segmentation step may comprise the results corresponding to the rotated tiles, inverting the rotation, and for each of the at least some tiles, merging the result of the original and the rotated tile.

The semantic segmentation step may comprise for the at least some tiles rotating the tiles around different angles and performing the steps of the preceding paragraph. The merging may comprise merging the result of the original and the respective rotated tiles.

The convolutional neural network may be trained with tiles comprising a lower resolution than the tiles processed in the segmentation step. In other words, the tiles for training may comprise more context, as discussed in the context of the system.

The segmentation step may comprise the post-processing step.

The post-processing step may comprise discarding groups comprising the extent below the threshold. The threshold may be pre-defined.

The post-processing step may comprise for a connected plurality of portions to which no class is assigned, assigning a first class, if the connected plurality is enclosed by connected portions to which the first class is assigned. In other words, the post-processing step may comprise filling hole-like artefacts within a group comprising a same class, as discussed in the context of the system.

The post-processing step may comprise for the connected plurality of portions to which no class is assigned, assigning the first class, only if the connected plurality is enclosed by connected portions to which the first class is assigned and if the extent of the connected plurality is below the threshold.

The post-processing step may comprise applying a conditional random fields algorithm to the borders of the groups.

Each part of the orthophoto map (O) may corresponds to an object in the area.

The segmentation step may comprises determining the polygon(s) based on the groups determined in the post-processing step.

The post-processing step may comprise removing excessive vertices of the polygon(s).

The segmentation step may comprise assigning at least 15, preferably at least 25 and still more preferably at least 30 different classes.

The portions may correspond to the surface of the area of at most 40 cm$^2$, preferably at most 20 cm$^2$, and still more preferably at most 10 cm$^2$.

The input orthophoto map may comprise a sampling distance between 20 cm-0.5 cm, preferably at most 10 cm-1 cm, and still more preferably between 5 cm and 1 cm.

The volume determining step may comprise determining for each reference surface a portion of the volume above the reference surface and a portion of the volume below the reference surface.

The method may further comprise providing design data. The design data may be CAD-data. The design data may be geo-referenced.

The method may further comprise processing the design data.

The input orthophoto map (O) and the input digital elevation model (DEM) may comprise geographic references.

The projection step may comprise determining the geographical positions of the vertexes of each polygon, such as the geographical coordinates of said vertexes.

The projection-step may comprise determining geo-referenced 3D-coordinates of the vertexes of the polygon(s).

The method may comprise the data comparison step.

The data comparison step may comprise comparing the polygon(s) and the design data.

The data comparison step may comprise determining the deviation(s) between the polygon(s) and the design data.

The data comparison step may comprise comparing the determined volume(s) to the design data.

The portions of the determined volume(s) may comprise at least one vertex per volume.

The portions of the determined volume(s) may comprise a two-dimensional shape, such as a polygon or a line.

The portions of the determined volume(s) may comprise a three-dimensional solid.

The data-comparison step may comprise generating reporting units based on the design data.

Generating the reporting units may comprise dividing at least one object represented by the design data into a plurality of reporting units spatially different from each other.

Generating the reporting units may comprises dividing at least one object represented by the design data into a plurality of reporting units. At least some of the reporting units may relate to different steps of a construction procedure, e.g. of a construction of a road.

Generating the reporting units may comprise dividing at least one object represented by the design data into a plurality of reporting units. At least some of the reporting units may relate to different points in time of a construction process.

The reporting units may be spatial objects.

In other words, in the above embodiment, each reporting unit may be an object selected from a point, a line, a polygon or a three-dimensional solid.

The method may comprise comparing the reporting units to the determined volume(s) and/or the determined parts of the orthophoto map, particularly the class of at least one determined group corresponding to a position of a respective reporting unit.

The method, particularly the data-comparison step, may comprise comparing polygon(s) corresponding to at least one of the reporting units and the design data.

The method, particularly the data-comparison step, may comprise determining deviation(s) between polygon(s) corresponding to at least one of the reporting units and the design data.

The data-comparison step may comprise updating the reporting units upon changes of the design data.

The method may comprise providing the first orthophoto map (O1), the second orthophoto map (O2), the first digital elevation model (DEM1) and the second digital elevation model (DEM2).

The method may comprise performing the segmentation step, the projection step and the reference surface generation step with the first orthophoto map (O1) as input orthophoto map (O) and the first digital elevation model (DEM1) as input digital elevation model (DEM), thus generating the first polygon(s) and the first reference surface(s).

The method may further comprise performing the segmentation step, the projection step and the reference surface generation step with the second orthophoto map (O2) as input orthophoto map (O) and the second digital elevation model (DEM2) as input digital elevation model (DEM), thus generating the second polygon(s) and the second reference surface(s).

The method may comprises performing the volume determining step for the first reference surface(s) and the first digital elevation model (DEM1) and thus generating the first volume(s), and performing the volume determining step for the second reference surface(s) and the second digital elevation model (DEM2) and thus generating the second volume(s).

The method may comprise the volume comparison step. The volume comparison step may comprise comparing at least some of the first and second volume(s).

The volume comparison step may comprise determining the volume differences between at least some of the first and the second volume(s).

The volume comparison step may comprise determining the volumes that are each present in only one of the first and the second volume(s).

The segmentation step, the projection step and the reference generation step may be computer implemented.

The volume determining step may be computer implemented.

The data comparison step may be computer implemented.

The volume comparison step may be computer implemented.

The method may be a method for analysis of aerial images.

The method may comprise receiving at least one of image data and elevation data from an aerial vehicle and/or a satellite.

The aerial vehicle may be an unmanned aerial vehicle.

The method may comprise generating at least one of the image data and the elevation data by means of an aerial vehicle, preferably by means of an unmanned aerial vehicle.

The area may comprise a construction site.

The orthophoto map may comprise RGB data.

The orthophoto map may also comprise infrared data.

The point cloud may be generated based on at least LIDAR-measurement. In other words, the point cloud may be generated by means of a LIDAR-sensor.

The method may comprise generating the at least one LIDAR-measurement.

The method may comprise generating the at least one LIDAR-measurement by means of a drone comprising a LIDAR-sensor. That is, the method may comprise operating a LIDAR-sensor attached to a drone flying over the area.

In other words, the LIDAR-measurement may be drone-based.

The method may comprise using the above-described system.

The system may be configured for performing the method according to any of the preceding method embodiments.

In a third embodiment, a computer program product is disclosed.

A computer program product may comprise instructions which, when the program is executed by a computer, cause the computer to carry out the steps of the above-disclosed method.

Another computer program product may comprise instructions which, when the program is executed by a data-processing system, cause the data-processing system to carry out the steps for which the data-processing system is configured.

The following embodiments also form part of the invention.

System Embodiments

Below, embodiments of a system will be discussed. The system embodiments are abbreviated by the letter "S" followed by a number. Whenever reference is herein made to the "system embodiments", these embodiments are meant.

S1. A system comprising a data-processing system (80), wherein the data-processing system is configured for providing an input orthophoto map (O) of an area (10), providing an input digital elevation model (DEM) of the area (10), generating at least one or a plurality of polygon(s) (40) based on the input orthophoto map (20), each polygon (40) approximating a part (30) of the input orthophoto map (O), projecting the polygon(s) (40) on the input digital elevation model (DEM) of the area, and generating a reference surface (50) for each of at least some of the polygon(s) (40).

S2. The system according to the preceding embodiment, wherein the data-processing system (80) comprises a data-storage component (82).

S3. The system according to the preceding embodiment, wherein the data-storage component (82) is configured for providing at least one of image data and elevation data.

S4. The system according to any of the two preceding embodiments, wherein the data-storage component (82) is configured for providing the input orthophoto map (O) and the input digital elevation model (DEM) of the area (10).

S5. The system according to any of the preceding embodiments, wherein the data-processing system (80) comprises a segmentation component (84), and wherein the segmentation component (84) is configured for generating the polygon(s) (40) based on the input orthophoto map (20), each polygon (40) approximating a part (30) of the input orthophoto map (O).

S6. The system according to any of the preceding embodiments, wherein the data-processing system (80) comprises a projection component (86), wherein the projection component (86) is configured for projecting the polygon(s) (40) on the input digital elevation model (DEM) of the area and for generating the reference surface (50) for each of the at least some of the polygon(s) (40).

S7. The system according to any of the preceding embodiments, wherein the data-processing system (80), particularly the projection component (86), is configured for determining for each vertex (45) of the polygon(s) (40) at least one coordinate corresponding to the projection of vertexes on the input digital elevation model (DEM), such as elevation coordinates of the vertexes (45).

S8. The system according to any of the preceding embodiments, wherein the data-processing system (80) is configured for determining a volume (60) between a portion of the input digital elevation model (DEM) and a portion of the reference surface (50) for each reference surface (50).

S9. The system according to the preceding embodiment, wherein the data-processing system (80) comprises a volume determining component (88) configured for determining the volume (60) between the portion of the input digital elevation model (DEM) and the portion of the reference surface (50) for each reference surface (50).

S10. The system according to any of the two preceding embodiments, wherein the portion of the reference surface (50) is a portion of the reference surface (50) within the corresponding polygon (40) and the portion of the input digital elevation model (DEM) is a portion of the input digital elevation model (DEM) within said polygon.

S11. The system according to any of the preceding embodiments, wherein the reference surface (50) is a surface approximating an object corresponding to a part of the orthophoto map (O) on side opposite to a surface of the object modelled by the digital elevation model (DEM).

S12. The system according to any of the preceding embodiments, wherein the reference surface (50) is a plane.

S13. The system according to the preceding embodiment, wherein the reference surface (50) is a horizontal plane.

S14. The system according to any of the preceding embodiments, wherein the data-processing system (80), particularly the projection component (86), is configured for processing elevation coordinates of the vertexes of the at least some polygon(s) projected to the input digital elevation model (DEM).

S15. The system according to the preceding embodiment, wherein processing the elevation coordinates of the vertexes comprises generating a statistic measure of the elevation coordinates, such as a minimum, a maximum, a mean or a median of the elevation coordinates.

S16. The system according to any of the two preceding embodiments, wherein the data-processing system (80), particularly the projection component (86), is configured for thus obtaining processed polygon(s) (40).

S17. The system according to any of the preceding embodiments, wherein the data-processing system (80), particularly the projection component (86), is configured for generating the reference surface based on a prior digital elevation model.

S18. The system according to any of the preceding embodiments, wherein the data-processing system (80), particularly the segmentation component (84), is configured for generating the polygon(s) (40) based on the input orthophoto map (O) and the input digital elevation model (DEM).

S19. The system according to any of the preceding embodiments with the features of S7, wherein the wherein the data-processing system is configured for providing at least one point cloud relating to at least a portion of the area (10), and wherein the data-processing system (80), particularly the projection component (86), is configured for determining at least one of the coordinate(s) corresponding to the projection of vertexes on the input digital elevation model (DEM) using the at least one point cloud.

S20. The system according to any of the preceding embodiments, wherein the data-processing system (80) comprises a pre-processing component (90).

S21. The system according to any of the preceding embodiments with the features of S18, wherein the data-processing system (80), particularly the pre-processing component (90), is configured for determining at least a component of a gradient of the input digital elevation model (DEM).

S22. The system according to the preceding embodiment, wherein the data-processing system (80), particularly the pre-processing component (90), is configured for determining at least two components of the gradient of the input digital elevation model (DEM).

S23. The system according to any of the preceding embodiments with the features of S19, wherein the data-processing system (80), particularly the pre-processing component (90), is configured for generating tiles of the input orthophoto map (O) and the digital elevation model (DEM).

S24. The system according to the preceding embodiment, wherein the tiles are overlapping in at least one direction.

S25. The system according to the preceding embodiment, wherein the tiles are overlapping in two directions.

S26. The system according to any of the preceding embodiments, wherein the data-processing system (80), particularly the segmentation component (84), is configured for determining the parts (30) of the orthophoto map (O) by means of at least one convolutional neural network.

S27. The system according to the preceding embodiment and with the features of S21, wherein the data-processing system (80), particularly the segmentation component (84), is configured for determining the parts (30) of the input orthophoto map (O) by means of at least one convolutional neural network based at least on the input orthophoto map (O) and the component(s) of the gradient of the input digital elevation model (DEM).

S28. The system according to any of the preceding embodiments, wherein the data-processing system (80), particularly the segmentation component (84), is configured for assigning different classes to different portions of the orthophoto map (O) by means of the at least one convolutional neural network.

S29. The system according to the preceding embodiment, wherein the data-processing system (80), particularly the segmentation component (84), is configured for assigning portions comprising same classes to groups.

S30. The system according to the preceding embodiment, wherein assigning the portions comprising same classes to groups is assigning connected portions comprising same classes to groups.

S31. The system according to any of the two preceding embodiments, wherein each group corresponds to a part (30) of the orthophoto map (O).

S32. The system according to any of the preceding embodiments and with the features of S5 and S23, wherein the data-processing system (80), particularly the segmentation component (84), is configured for processing at least some of the tiles individually.

S33. The system according to the preceding embodiment, wherein the data-processing system (80), particularly the segmentation component (84), is configured for merging results from processing of the tiles.

S34. The system according to the preceding embodiment and with the features of at least one of S24 and S25, wherein the data-processing system (80), particularly the segmentation component (84), is configured for merging the classes assigned to same portions in different tiles by a merging operator.

S35. The system according to any of the preceding embodiments with the features of S32 and preferably with the features of S34, wherein the data-processing system (80), particularly the segmentation component (84) is configured for are not considering and/or weighting lower the classes assigned to portions of the tiles within a pre-defined distance to a border of the respective tile in the merging operator.

S36. The system according to any of the preceding embodiments with the features of S32, wherein the data-processing system (80), particularly the segmentation component (84), is configured for at least some tiles for
 rotating the tiles,
 processing the rotated and the original tiles by means of the at least one convolutional network,
 for the results corresponding to the rotated tiles, inverting the rotation, and
 for each of the at least some tiles, merging the result of the original and the rotated tile.

S37. The system according to any of the preceding embodiments with the features of S26, wherein the convolutional neural network is a network trained with tiles comprising a lower resolution than the tiles processed by the data-processing system (80) and/or the segmentation component (84).

S38. The system according to any of the preceding embodiments with the features of S28, wherein the data-processing system (80) comprises a post-processing component (92).

S39. The system according to any of the preceding embodiments with the features of S28, wherein the data-processing system (80), particularly the post-processing component (92), is configured for discarding groups comprising an extent below a threshold.

S40. The system according to any of the preceding embodiments with the features of S28, wherein the data-processing system (80), particularly the post-processing component (92), is configured for assigning a first class to a connected plurality of portions to which no class is assigned, if the connected plurality is enclosed by connected portions to which the first class is assigned.

S41. The system according to the preceding embodiment, wherein the data-processing system (80), particularly the post-processing component (92), is configured for only assigning the first class to the connected plurality of portions to which no class is assigned, if the connected plurality is enclosed by connected portions to which the first class is assigned and if the extent of the connected plurality is below the threshold.

S42. The system according to any of the preceding embodiments with the features of S28, wherein the data-processing system (80), particularly the post-processing component (92), is configured for applying a conditional random fields algorithm to the borders of the groups.

S43. The system according to any of the preceding embodiments, wherein each part (30) of the orthophoto map (O) corresponds to an object in the area (10).

S44. The system according to any of the preceding embodiments with the features of S39, wherein data-processing system (80), particularly the segmentation component (84), is configured for determining the polygon(s) based on the determined groups, such as the groups determined by the post-processing component.

S45. The system according to the preceding embodiment and with the features of S40, wherein the data-processing system (80), particularly the post-processing component (92), is configured for removing excessive vertices of the polygon(s).

S46. The system according to any of the preceding embodiments with the features of S28, wherein the data-processing system (80), particularly the segmentation component (84), is configured for assigning at least 15, preferably at least 25 and still more preferably at least 30 different classes.

S47. The system according to any of the preceding embodiments with the features of S28, wherein the data-processing system (80) is configured for processing portions corresponding to a surface of the area (10) of at most 40 cm$^2$, preferably at most 20 cm$^2$, and still more preferably at most 10 cm$^2$.

S48. The system according to any of the preceding embodiments, wherein the input orthophoto map comprises a sampling distance between 20 cm-0.5 cm, preferably at most 10 cm-1 cm, and still more preferably between 5 cm and 1 cm.

S49. The system according to any of the preceding embodiments with the features of S8, wherein the data-processing system (80), particularly the volume determining component (88), is configured for determining for each reference surface a portion of the volume above the reference surface and a portion of the volume below the reference surface.

S50. The system according to any of the preceding embodiments, wherein the data-processing system (80) is further configured for providing design data (20).

S51. The system according to the preceding embodiment and with the features of S2, wherein the data-storage component (82) is configured for providing the design data (20).

S52. The system according to any of the preceding embodiments, wherein the data-processing system (80) further comprises an area-comparison component (94).

S53. The system according to any of the preceding embodiments with the features of S50, wherein the data-processing system (80) is further configured for processing the design data.

S54. The system according to any of the preceding embodiments, wherein the input orthophoto map (O) and the input digital elevation model (DEM) comprise geographic references.

S55. The system according to the preceding embodiment and with the features of S7, wherein the data-processing system (80), particularly the projection component (86), is configured for determining geographical positions of the vertexes (45) of each polygon (40), such as geographical coordinates of said vertexes.

S56. The system according to any of the preceding embodiments with the features of S54 and S7, wherein the data-processing system (80), particularly the projection component (86), is configured for determining geo-referenced 3D-coordinates of the vertexes (45) of the polygon(s) (40).

S57. The system according to any of the preceding three embodiments, wherein the data-processing system (80), particularly the area-comparison component (94), is configured for comparing the polygon(s) (40) and the design data.

S58. The system according to the preceding embodiment, wherein the data-processing system (80), particularly the area-comparison component (94), is configured for determining deviation(s) between the polygon(s) (40) and the design data (20).

S59. The system according to any of the preceding embodiments and with the features of S8 and S57, wherein the data-processing system (80), particularly the area-comparison component (94), is configured for comparing at least portions of the determined volume(s) to the design data (20).

S60. The system according to the preceding embodiment, wherein the portions of the determined volume(s) comprise at least one vertex per volume.

S61. The system according to any of the two preceding embodiments, wherein the portions of the determined volume(s) comprise a two-dimensional shape, such as a polygon or a line.

S62. The system according to any of the three preceding embodiments, wherein the portions of the determined volume(s) comprise a three-dimensional solid.

S63. The system according to any of the preceding embodiments with the features of S50, wherein the data-processing system (80), particularly the area-comparison component (94), is configured for generating reporting units based on the design data.

S64. The system according to the preceding embodiment, wherein generating the reporting units comprises dividing at least one object represented by the design data into a plurality of reporting units spatially different from each other.

S65. The system according to any of the two preceding embodiments, wherein generating the reporting units comprises dividing at least one object represented by the design data into a plurality of reporting units, wherein at least some of the reporting units relate to different steps of a construction procedure, e.g. of a construction of a road.

S66. The system according to any of the three preceding embodiments, wherein generating the reporting units comprises dividing at least one object represented by the design data into a plurality of reporting units, wherein at least some of the reporting units relate to different points in time of a construction process.

S67. The system according to any of the four preceding embodiments, wherein the reporting units are spatial objects.

S68. The system according to any of the preceding embodiments with the features of S63 and particularly with the features of at least one of S8 and S26, wherein the wherein the data-processing system (80), particularly the area-comparison component (94), is configured for comparing the reporting units to at least one of the determined volume(s) and the determined parts (30) of the orthophoto map (O), particularly the class of at least one determined group corresponding to a position of a respective reporting unit.

S69. The system according to any of the preceding embodiments with the features of S57 and S63, wherein the data-processing system (80), particularly the area-comparison component (94), is configured for comparing polygon(s) (40) corresponding to at least one of the reporting units and the design data.

S70. The system according to any of the preceding embodiments with the features of S58 and S63, wherein the data-processing system (80), particularly the area-comparison component (94), is configured for determining deviation(s) between polygon(s) (40) corresponding to at least one of the reporting units and the design data (20).

S71. The system according to any of the preceding embodiments with the features of S63, wherein the data-processing system (80), particularly the area-comparison component (94), is configured for updating the reporting units upon changes of the design data.

S72. The system according to any of the preceding method embodiments, wherein the data-processing system (80), particularly the data-storage component (82), is configured for providing a first orthophoto map (O1), a second orthophoto map (O2), a first digital elevation model (DEM1) and a second digital elevation model (DEM2).

S73. The system according to any of the preceding embodiments, wherein the data-processing system is further configured for processing the first orthophoto map (O1) as input orthophoto map (O) and the first digital elevation model (DEM1) as input digital elevation model (DEM), thus generating first polygon(s) (40a) and first reference surface(s) (50a); and with the second orthophoto map (O2) as input orthophoto map (O) and the second digital elevation model (DEM2) as input digital elevation model (DEM), thus generating second polygon(s) (40b) and second reference surface(s) (50b).

S74. The system according to the preceding embodiment and with the features of S5 and S6, wherein the segmentation component (84) and the projection component (86) are configured for processing the first orthophoto map (O1) as input orthophoto map (O) and the first digital elevation model (DEM1) as input digital elevation model (DEM), the segmentation component configured for thus generating first polygon(s) (40a) and the projection component configured for thus generating first reference surface(s) (50a); and the second orthophoto map (O2) as input orthophoto map (O) and the second digital elevation model (DEM2) as input digital elevation model (DEM), the segmentation component configured for thus generating second polygon(s) (40*b*) and the projection component configured for thus generating second reference surface(s) (50*b*).

S75. The system according to any of the two preceding embodiments, wherein the data-processing (80) system, particularly the volume determining component (88), is configured for processing the first reference surface(s) (50*a*) and the first digital elevation model (DEM1) and thus generating first volume(s), and for processing the second reference surface(s) (50*b*) and the second digital elevation model (DEM2) and thus generating second volume(s).

S76. The system according to any of the two preceding embodiments, wherein the data-processing system (80), particularly the volume determining component (88), is configured for comparing at least some of the first and second volume(s).

S77. The system according to the preceding embodiment, wherein the data-processing system (80), particularly the volume determining component (88), is configured for determining volume differences between at least some of the first and the second volume(s) (60*a*, 60*b*).

S78. The system according to any of the three preceding embodiments, wherein the data-processing system (80), particularly the volume determining component (88), is configured for determining volumes that are present in only one of the first and the second volume (s).

S79. The system according to any of the preceding system embodiments, wherein the system is a system configured for analysis of aerial images.

S80. The system according to any of the preceding system embodiments, wherein the data-processing system (80) is configured for receiving at least one of image data and elevation data from an aerial vehicle and/or a satellite.

S81. The system according to the preceding embodiment, wherein the aerial vehicle is an unmanned aerial vehicle.

S82. The system according to any of the preceding embodiments, wherein the system comprises the aerial vehicle, preferably the unmanned aerial vehicle, and wherein the aerial vehicle, preferably the unmanned aerial vehicle, is configured for generating at least one of the image data and the elevation data.

S83. The system according to any of the preceding embodiments, wherein the area (10) comprises a construction site.

S84. The system according to any of the preceding embodiments, wherein the orthophoto map comprises RGB data.

S85. The system according to any of the preceding embodiments, wherein the orthophoto map comprises infrared data.

S86. The system according to any of the preceding embodiments with the features of S19, wherein the point cloud is generated based on at least LIDAR-measurement.

S87. The system according to the preceding embodiment, wherein the LIDAR-measurement is performed by a drone comprising a LIDAR-sensor.

Method Embodiments

Below, embodiments of a method will be discussed. The method embodiments are abbreviated by the letter "M" followed by a number. Whenever reference is herein made to the "method embodiments", these embodiments are meant.

M1. A method, comprising
  providing an input orthophoto map (O) of an area (10),
  providing an input digital elevation model (DEM) of the area (10),
  performing a segmentation step, wherein the segmentation step comprises generating at least one or a plurality of polygon(s) (40) based on the input orthophoto map (20), each polygon (40) approximating a part (30) of the input orthophoto map (O),
  performing a projection step, the projection step comprising projecting the polygon(s) (40) on the input digital elevation model (DEM) of the area, and
  a reference surface generation step, the reference surface generation step comprising generating a reference surface (50) for each of at least some of the polygon(s) (40).

M2. The method according to the preceding embodiment, wherein the projection step comprises determining for each vertex (45) of the polygon(s) (40) at least one coordinate corresponding to the projection of vertexes on the input digital elevation model (DEM), such as elevation coordinates of the vertexes (45).

M3. The method according to any of the preceding method embodiments, wherein the method further comprises a volume determining step, the volume determining step comprising for each reference surface (50) determining a volume (60) between a portion of the input digital elevation model (DEM) and a portion of the reference surface (50).

M4. The method according to the preceding embodiment, wherein the portion of the reference surface (50) is a portion of the reference surface (50) within the corresponding polygon (40) and the portion of the input digital elevation model (DEM) is a portion of the input digital elevation model (DEM) within said polygon.

M5. The method according to any of the preceding method embodiments, wherein the reference surface (50) is a plane.

M6. The method according to the preceding embodiment, wherein the reference surface (50) is a surface approximating an object corresponding to a part of the orthophoto map (O) on a side opposite to a surface of the object modelled by the digital elevation model (DEM).

M7. The method according to any of the two preceding embodiments, wherein the reference surface (50) is a horizontal plane.

M8. The method according to any of the preceding method embodiments, wherein the reference surface generation step comprises processing elevation coordinates of the vertexes of the at least some polygon(s) projected to the input digital elevation model (DEM).

M9. The method according to the preceding embodiment, wherein processing the elevation coordinates of the vertexes comprises generating a statistic measure of the elevation coordinates, preferably a median of the elevation coordinates.

M10. The method according to any of the two preceding embodiments, wherein the reference surface generation step comprises thus obtaining processed polygon(s) (40).

M11. The method according to any of the preceding method embodiments, wherein the reference surface generation step comprises generating the reference surface based on a prior digital elevation model.

M12. The method according to any of the preceding method embodiments, wherein the segmentation step comprises generating the polygon(s) (40) based on the input orthophoto map (O) and the input digital elevation model (DEM).

M13. The method according to any of the preceding embodiments with the features of M2, wherein the method comprises providing at least one point cloud relating to at least a portion of the area (10), and wherein the projection step comprises determining at least one of the coordinate(s) corresponding to the projection of vertexes on the input digital elevation model (DEM) using the at least one point cloud.

M14. The method according to any of the preceding method embodiments, wherein the semantic segmentation step comprises a pre-processing step.

M15. The method according to the preceding two embodiments, wherein the pre-processing step comprises determining at least a component of a gradient of the input digital elevation model (DEM).

M16. The method according to the preceding embodiment, wherein the pre-processing step comprises determining at least two components of the gradient of the input digital elevation model (DEM).

M17. The method according to any of the preceding embodiments with the features of M14, wherein the pre-processing step comprises generating tiles of the input orthophoto map (O) and the digital elevation model (DEM).

M18. The method according to the preceding embodiment, wherein the tiles are overlapping in at least one direction.

M19. The method according to the preceding embodiment, wherein the tiles are overlapping in two directions.

M20. The method according to any of the preceding method embodiments, wherein the segmentation step comprises determining the parts (30) of the orthophoto map (O) by means of at least one convolutional neural network.

M21. The method according to the preceding embodiment and with the features of M15, wherein the segmentation step comprises determining the parts (30) of the input orthophoto map (O) by means of at least one convolutional neural network based at least on the input orthophoto map (O) and the component(s) of the gradient of the input digital elevation model (DEM).

M22. The method according to any of the preceding method embodiments, wherein the segmentation step comprises assigning different classes to different portions of the orthophoto map (O) by the at least one convolutional neural network.

M23. The method according to the preceding embodiment, wherein the segmentation step comprises assigning portions comprising same classes to groups.

M24. The method according to the preceding embodiment, wherein assigning the portions comprising same classes to groups is assigning connected portions comprising same classes to groups.

M25. The method according to any of the two preceding embodiments, wherein each group corresponds to a part (30) of the orthophoto map (O).

M26. The method according to any of the preceding embodiments with the features of M22 and M17, wherein the method comprises processing at least some tiles individually by means of the at least one convolutional neural network.

M27. The method according to the preceding embodiment, wherein the segmentation step comprises merging results from processing of the tiles.

M28. The method according to the preceding embodiment and with the features of at least one of M18 and M19, wherein the segmentation step comprises merging the classes assigned to same portions in different tiles by a merging operator.

M29. The method according to any of the preceding embodiments with the features of M26 and preferably with the features of M28, wherein the classes assigned to portions of the tiles within a pre-defined distance to a border of the respective tile are not considered and/or weighted lower in the merging operator.

M30. The method according to any of the preceding embodiments with the features of M26, wherein the semantic segmentation step comprises for at least some tiles, rotating the tiles, processing the rotated and the original tiles by means of the at least one convolutional network, for the results corresponding to the rotated tiles, inverting the rotation, and for each of the at least some tiles, merging the result of the original and the rotated tile.

M31. The method according to the preceding embodiment, wherein the semantic segmentation step comprises for the at least some tiles rotating the tiles around different angles and performing the steps of M30, wherein the merging comprises merging the result of the original and the respective rotated tiles.

M32. The method according to any of the preceding method embodiments with the features of M20, wherein the convolutional neural network has been trained with tiles comprising a lower resolution than the tiles processed in the segmentation step.

M33. The method according to any of the preceding method embodiments with the features of M22, wherein the segmentation step comprises a post-processing step.

M34. The method according to the preceding embodiment, wherein the post-processing step comprises discarding groups comprising an extent below a threshold.

M35. The method according to any of the two preceding embodiments, wherein the post-processing step comprises for a connected plurality of portions to which no class is assigned, assigning a first class, if the connected plurality is enclosed by connected portions to which the first class is assigned.

M36. The method according to the preceding embodiment, wherein the post-processing step comprises for the connected plurality of portions to which no class is assigned, assigning the first class, only if the connected plurality is enclosed by connected portions to which the first class is assigned and if the extent of the connected plurality is below the threshold.

M37. The method according to any of the preceding method embodiments with the features of M33, wherein the post-processing step comprises applying a conditional random fields algorithm to the borders of the groups.

M38. The method according to any of the preceding method embodiments, wherein each part (30) of the orthophoto map (O) corresponds to an object in the area (10).

M39. The method according to any of the five preceding embodiments, wherein the segmentation step comprises determining the polygon(s) based on the groups determined in the post-processing step.

M40. The method according to the preceding embodiment and with the features of M33, wherein the post-processing step comprises removing excessive vertices of the polygon(s).

M41. The method according to any of the preceding embodiments with the features of M22, wherein the segmentation step comprises assigning at least 15, preferably at least 25 and still more preferably at least 30 different classes.

M42. The method according to any of the preceding embodiments with the features of M22, wherein the portions correspond to a surface of the area (10) of at most 40 cm$^2$, preferably at most 20 cm$^2$, and still more preferably at most 10 cm$^2$.

M43. The method according to any of the preceding embodiments, wherein the input orthophoto map comprises a sampling distance between 20 cm-0.5 cm, preferably at most 10 cm-1 cm, and still more preferably between 5 cm and 1 cm.

M44. The method according to any of the preceding method embodiments with the features of M3, wherein the volume determining step comprises determining for each reference surface a portion of the volume above the reference surface and a portion of the volume below the reference surface.

M45. The method according to any of the preceding method embodiments, further comprising providing design data (20).

M46. The method according to the preceding embodiment, further comprising processing the design data.

M47. The method according to any of the preceding method embodiments, wherein the input orthophoto map (O) and the input digital elevation model (DEM) comprise geographic references.

M48. The method according to the preceding method embodiment and with the features of M2, wherein the projection step comprises determining geographical positions of the vertexes (45) of each polygon (40), such as geographical coordinates of said vertexes.

M49. The method according to any of the preceding method embodiments with the features of M47 and M2, wherein the projection-step comprises determining geo-referenced 3D-coordinates of the vertexes (45) of the polygon(s) (40).

M50. The method according to any of the preceding three embodiments, wherein the method comprises a data comparison step.

M51. The method according to the preceding embodiment, wherein the data comparison step comprises comparing the polygon(s) (40) and the design data.

M52. The method according to any of the two preceding embodiments, wherein the data comparison step comprises determining deviation(s) between the polygon(s) (40) and the design data (20).

M53. The method according to any of the three preceding embodiments and with the features of M3, wherein the data comparison step comprises comparing the determined volume(s) to the design data (20).

M54. The method according to the preceding embodiment, wherein the portions of the determined volume(s) comprise at least one vertex per volume.

M55. The method according to any of the two preceding embodiments, wherein the portions of the determined volume(s) comprise a two-dimensional shape, such as a polygon or a line.

M56. The method according to any of the three preceding embodiments, wherein the portions of the determined volume(s) comprise a three-dimensional solid.

M57. The method according to any of the preceding method embodiments with the features of M50, wherein the data-comparison step comprises generating reporting units based on the design data.

M58. The method according to the preceding embodiment, wherein generating the reporting units comprises dividing at least one object represented by the design data into a plurality of reporting units spatially different from each other.

M59. The method according to any of the two preceding embodiments, wherein generating the reporting units comprises dividing at least one object represented by the design data into a plurality of reporting units, wherein at least some of the reporting units relate to different steps of a construction procedure, e.g. of a construction of a road.

M60. The method according to any of the three preceding method embodiments, wherein generating the reporting units comprises dividing at least one object represented by the design data into a plurality of reporting units, wherein at least some of the reporting units relate to different points in time of a construction process.

M61. The method according to any of the four preceding embodiments, wherein the reporting units are spatial objects.

M62. The method according to any of the preceding method embodiments with the features of M57 and particularly with the features of at least one of M3 and M20, wherein the method comprises comparing the reporting units to at least one of the determined volume(s) and the determined parts (30) of the orthophoto map (O), particularly the class of at least one determined group corresponding to a position of a respective reporting unit.

M63. The method according to any of the preceding method embodiments with the features of M51 and M57, wherein the method, particularly the data-comparison step, comprises comparing polygon(s) (40) corresponding to at least one of the reporting units and the design data.

M64. The method according to any of the preceding method embodiments with the features of M52 and M57, wherein the method, particularly the data-comparison step, comprises determining deviation(s) between polygon(s) (40) corresponding to at least one of the reporting units and the design data (20).

M65. The method according to any of the preceding method embodiments with the features of M57, wherein the data-comparison step comprises updating the reporting units upon changes of the design data.

M66. The method according to any of the preceding method embodiments, wherein the method comprises providing a first orthophoto map (O1), a second orthophoto map (O2), a first digital elevation model (DEM1) and a second digital elevation model (DEM2).

M67. The method according to any of the preceding method embodiments, wherein the method further comprises performing the segmentation step, the projection step and the reference surface generation step with the first orthophoto map (O1) as input orthophoto map (O) and the first digital elevation model (DEM1) as input digital elevation model (DEM), thus generating first polygon(s) (40*a*) and first reference surface(s) (50*a*); and with the second orthophoto map (O2) as input orthophoto map (O) and the second digital elevation model (DEM2) as input digital elevation model (DEM), thus generating second polygon(s) (40*b*) and second reference surface(s) (50*b*).

M68. The method according to the preceding embodiment, wherein the method comprises performing the volume determining step for the first reference surface (s) (50*a*) and the first digital elevation model (DEM1) and thus generating first volume(s), and performing the volume determining step for the second reference surface(s) (50*b*) and the second digital elevation model (DEM2) and thus generating second volume(s).

M69. The method according to the preceding embodiment, wherein the method comprises a volume comparison step, wherein the volume comparison step comprises comparing at least some of the first and second volume(s).

M70. The method according to the preceding embodiment, wherein the volume comparison step comprises determining volume differences between at least some of the first and the second volume(s) (60*a*, 60*b*).

M71. The method according to any of the two preceding embodiments, wherein the volume comparison step comprises determining volumes that are each present in only one of the first and the second volume(s).

M72. The method according to any of the preceding method embodiments, wherein the segmentation step, the projection step and the reference generation step are computer implemented.

M73. The method according to any of the preceding method embodiments with the features of M3, wherein the volume determining step is computer implemented.

M74. The method according to any of the preceding method embodiments with the features of M50, wherein the data comparison step is computer implemented.

M75. The method according to any of the preceding method embodiments with the features of M69, wherein the volume comparison step is computer implemented.

M76. The method according to any of the preceding method embodiments, wherein the method is a method for analysis of aerial images.

M77. The method according to any of the preceding method embodiments, wherein the method comprises receiving at least one of image data and elevation data from an aerial vehicle and/or a satellite.

M78. The method according to the preceding embodiment, wherein the aerial vehicle is an unmanned aerial vehicle.

M79. The method according to any of the preceding method embodiments, wherein the method comprises generating at least one of the image data and the elevation data by means of an aerial vehicle, preferably by means of an unmanned aerial vehicle.

M80. The method according to any of the preceding method embodiments, wherein the area (10) comprises a construction site.

M81. The method according to any of the preceding method embodiments, wherein the orthophoto map comprises RGB data.

M82. The method according to any of the preceding method embodiments, wherein the method comprises using the system according to any of the system embodiments.

M83. The method according to any of the preceding method embodiments, wherein the orthophoto map comprises infrared data.

M84. The method according to any of the preceding method embodiments with the features of M14, wherein the point cloud is generated based on at least LIDAR-measurement.

M85. The method according to the preceding embodiment, wherein the method comprises generating the at least one LIDAR-measurement.

M86. The method according to the preceding embodiment, wherein the method comprises generating the at least one LIDAR-measurement by means of a drone comprising a LIDAR-sensor.

M87. The method according to the preceding embodiment, wherein the LIDAR-measurement is drone-based.

S85. The system according to any of the preceding system embodiments, wherein the system is configured for performing the method according to any of the preceding method embodiments.

Computer Program Product Embodiments

Below, embodiments of a computer program product will be discussed. These embodiments are abbreviated by the letter "C" followed by a number. Whenever reference is herein made to the "computer program product embodiments", these embodiments are meant.

C1. A computer program product comprising instructions which, when the program is executed by a computer, cause the computer to carry out the steps of the method according to any of the method embodiments.

C2. A computer program product comprising instructions which, when the program is executed by a data-processing system (80), cause the data-processing system (80) to perform the operations for which the data-processing system (80) is configured.

Exemplary features of the invention are further detailed in the figures and the below description of the figures.

DETAILED FIGURE DESCRIPTION

For the sake of clarity, some features may only be shown in some figures, and others may be omitted. However, also the omitted features may be present, and the shown and discussed features do not need to be present in all embodiments.

Figure 1A:
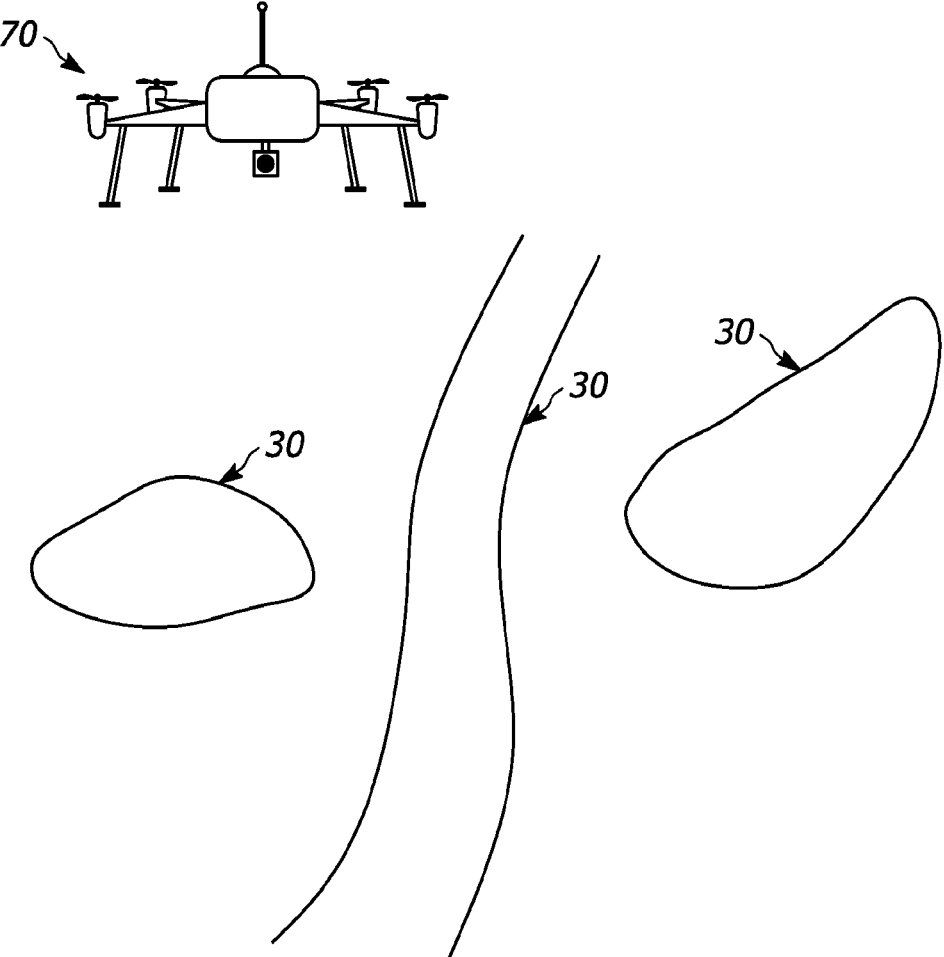
FIG. 1*a* shows an unmanned aerial vehicle over a construction site.

FIG. 1a shows an aerial vehicle flying over an area 10, such as a construction site. The aerial vehicle may be an unmanned aerial vehicle 70, which may also be referred to as drone. The aerial vehicle may comprise a camera for taking at least one image of the area. The aerial vehicle may further comprise a sensing device configured for sensing a height of the area, e.g. a distance sensor, an altitude sensor and a corresponding processing unit.

Based on the data generated by the aerial vehicle 70, an orthophoto map O and a digital elevation model DEM may be generated.

This is typically achieved by a photogrammetry process well known in the art. Background and application are for example discussed in Ahmadi, Farshid Farnood, and Hamid Ebadi: "*An integrated photogrammetric and spatial database management system for producing fully structured data using aerial and remote sensing images.*" Sensors (Basel, Switzerland) vol. 9,4 (2009): 2320-33. doi:10.3390/s90402320

For the photogrammetry process, e.g. the software Pix4Dmapper, available from Pix4D S.A., Prilly, Switzerland, can be used.

The aerial vehicle may comprise or be a multirotor drone, a fixed-wing drone and/or a vertical take-off and landing drone. The aerial vehicle may comprise an optical sensor for taking at least two images of the area. The aerial vehicle may further comprise a sensing device configured for sensing a height of the area, e.g. a distance sensor, an altitude sensor and a corresponding processing unit.

The aerial vehicle may also comprise components enabling a Real-Time Kinematic (RTK) and a Post-Processing Kinematic (PPK) technology. Both technologies may comprise receiving additional image data from satellites and a stationary ground station.

Further, FIG. 1a shows objects in the area 10. The objects may be parts 30 of the orthophoto map O and the digital elevation model. The objects may for example comprise heaps of sand or other material, or sand. However, the objects may also comprise machinery, materials for construction such as concrete parts or pipes, or an object that is under construction, such as a street, a building or infrastructure objects.

Figure 1B:
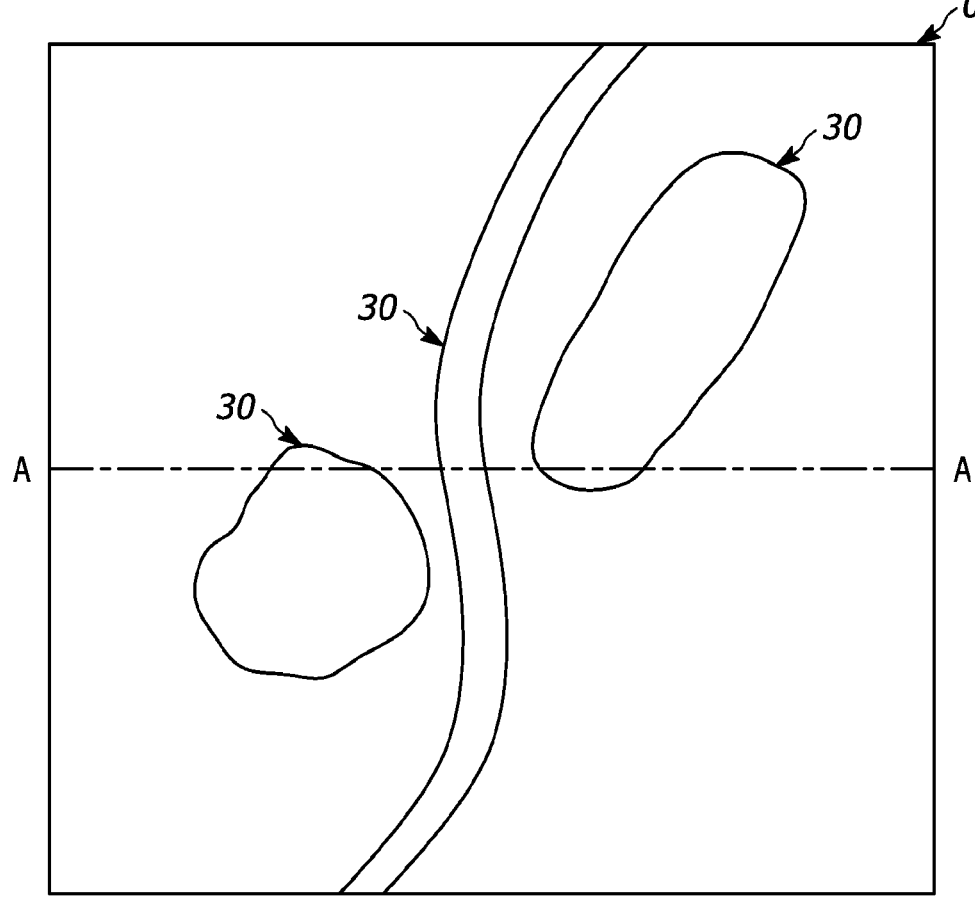
FIG. 1*b* shows an orthophoto map and a digital elevation model of the construction site.
Figure 1B:
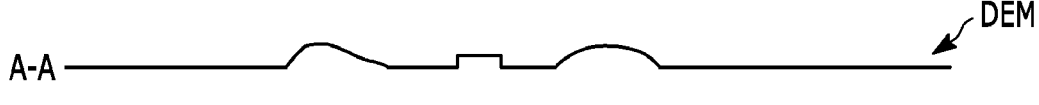

FIG. 1b shows an orthophoto map O generated by the at least one or a plurality of images of the area 10. The orthophoto map O may comprise RGB-data. However, the orthophoto map may also comprise different data, e.g. infrared data.

The area can comprise a construction site. The construction site can be an infrastructure construction site.

The surface of the area can depend, particularly on the structure to be built: In case of a solar farm, the area may have dimensions of about 2 km×2 km, in case of a highway, the area may have dimensions of 10 km×100 m. However, other areas may have other dimensions, e.g. a building in an area of 300×300 m, or an area comprising still different dimensions.

FIG. 1b further shows a portion of a digital elevation model DEM generated based on data provided by the aerial vehicle. The digital elevation model DEM comprises height information for points of the area 10. Thus, it can be interpreted as 3D-map.

The part of the digital elevation model shown in FIG. 1b corresponds to the line A-A indicated in the orthophoto map O. For each pixel of the line, the digital elevation model comprises a height information.

Figure 2:
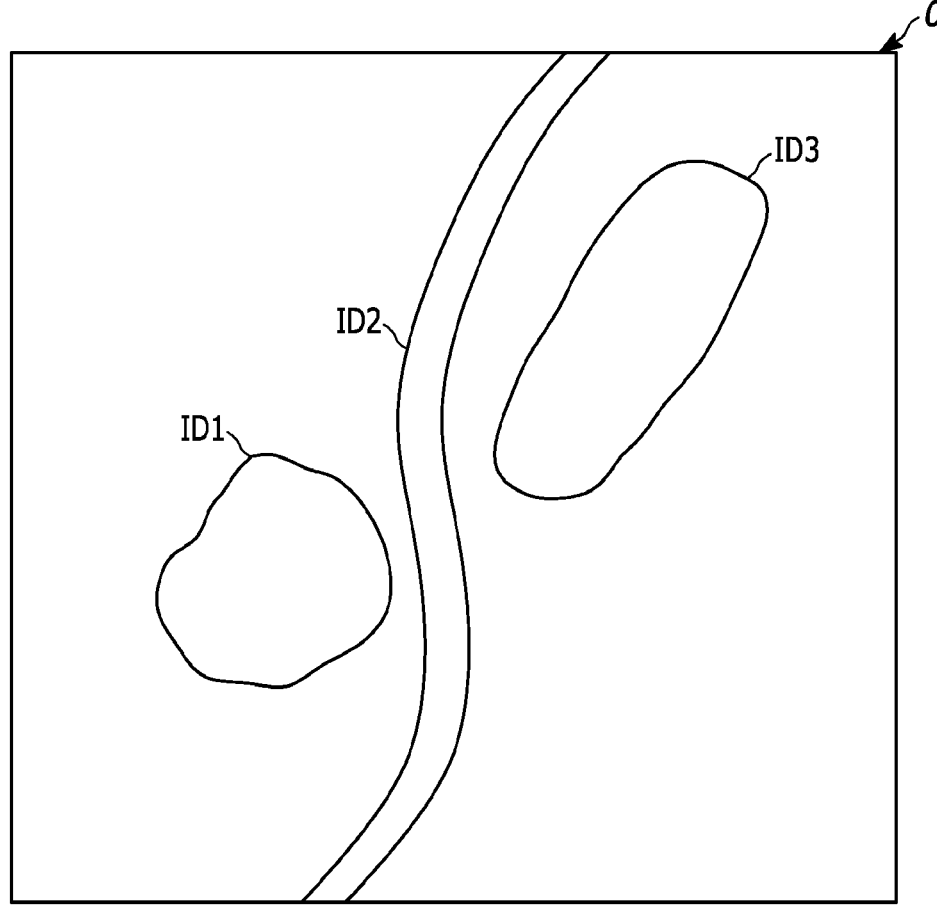
FIG. 2 shows classes assigned to objects on the construction site.

FIG. 2 shows classes assigned to parts 30 of the area 10. In the example of FIG. 2, an ID-variable comprises the class information. As can be seen in FIG. 2, generally, the classes may correspond to the class of the object corresponding to the respective part 30. In the example of FIG. 2, there is a heap of sand (ID 3), asphalt (ID 2) and a heap of earth (ID 3).

Figure 3:
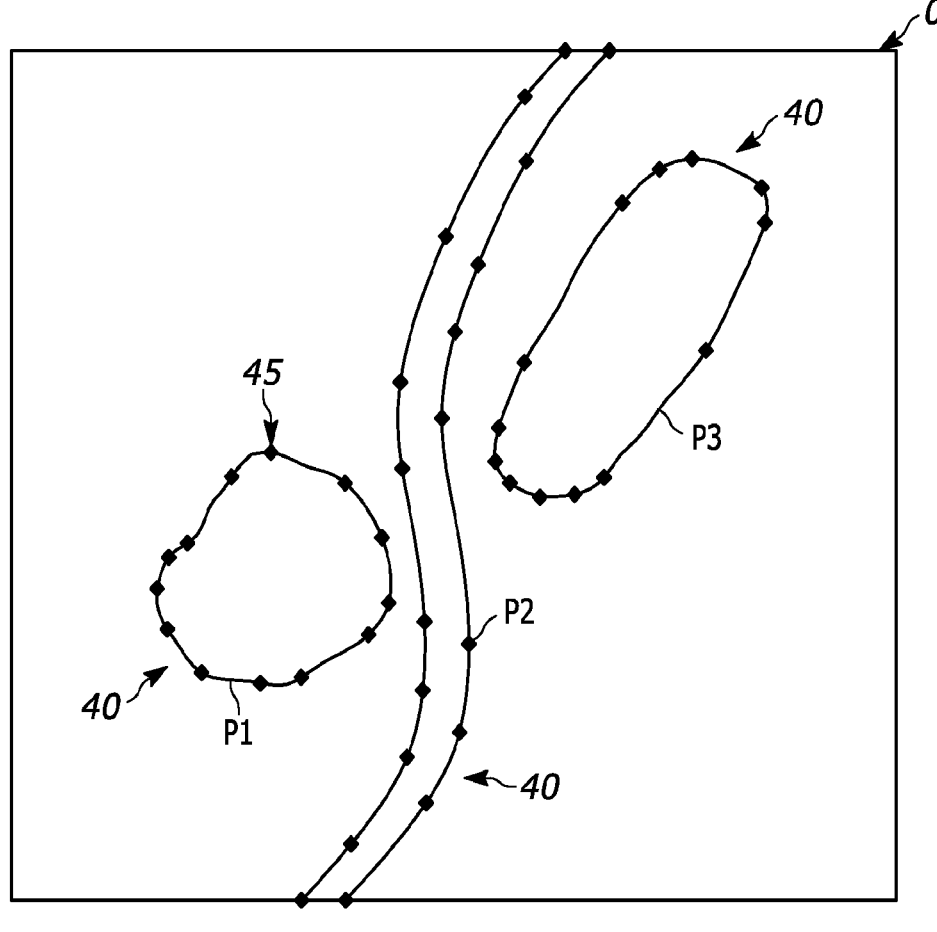
FIG. 3 shows a view of polygons representing the objects.

FIG. 3 shows again the orthophoto map O of the area 10.

In the orthophoto map O, polygons 40 approximating the parts 30 are shown. The polygons 40 may for example delimit the parts 30. However, there may also be a plurality of polygons approximating each part, e.g. in a case where the polygons are triangles. Each polygon comprises a plurality of vertexes 45.

The polygons 40 may be 2-dimensional. For example, for the purpose of semantic segmentation, the parts 30 of the area 10 may be approximated by polygons 40 that are indicated by x/y-coordinates of the orthophoto map (or by other two-dimensional coordinates of the orthophoto map).

However, the polygons 40 may also be 3-dimensional, e.g. the vertices may comprise x/y/z-coordinates. Also, the polygons 40 may be 2-dimensional at one point and may be converted to 3-dimensions, e.g. by assigning a third coordinates to the vertices (45).

Figure 4:
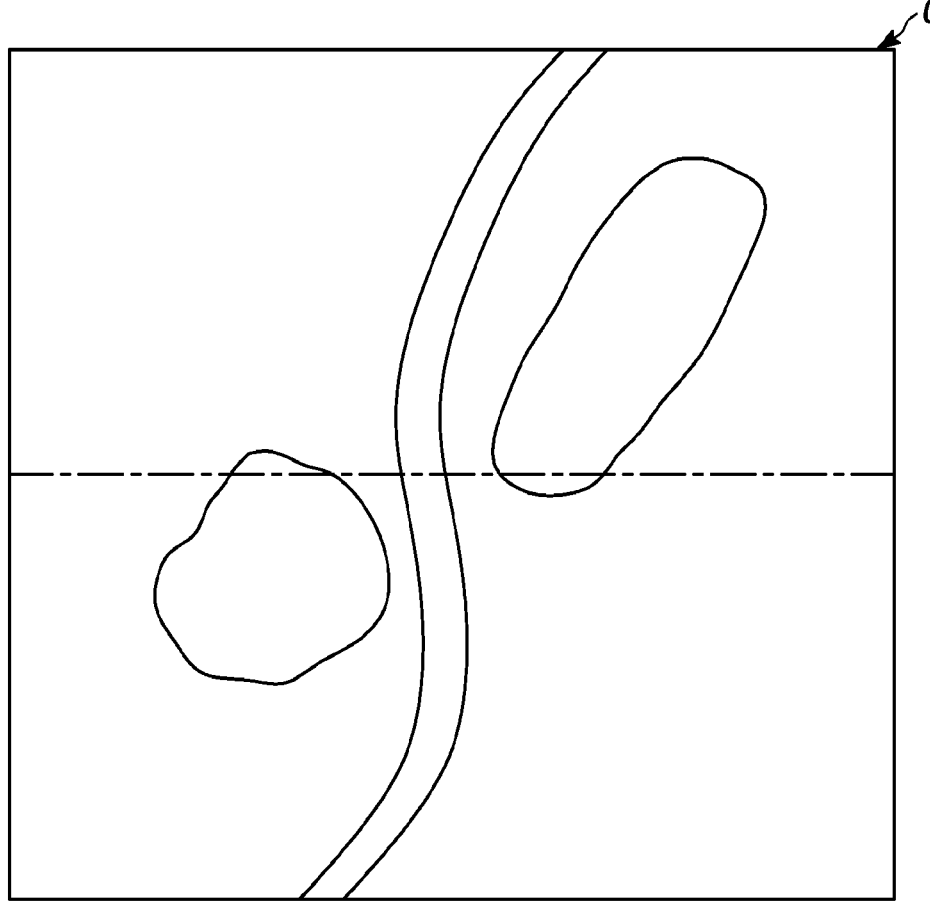
FIG. 4 shows reference surfaces of for the objects.
Figure 4:
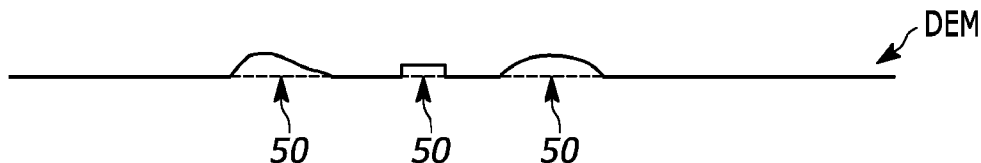

FIG. 4 shows the orthophoto map O and the digital elevation model DEM. FIG. 4 further shows reference surfaces 50 (indicated by the dashed lines in the DEM). In the example of FIG. 4, the reference surfaces are plane surfaces, however, they can also have another shape, such as a more complex shape.

The reference surfaces 50 may approximate lower ends of at least some of the objects corresponding to the parts 40. For example in case of heaps of material, e.g. sand or earth, the lower end may be a ground surface on which the material was dumped or heaped up.

The vertexes 45 of at least some or all of the polygons 40 may lie in the corresponding reference surface 50 at one point of the method. For example, the polygons 40 may be generated as 2-dimensional polygons, that are then projected on the reference surface 50, further comprising assigning corresponding elevation coordinates to the vertexes 45.

In another example, the vertexes 45 of the polygons 40 comprise already elevation coordinates, that are then adapted. For example, a median, an average or another estimation of the elevation coordinates of the vertexes 45 a polygon 40 may then be assigned to these vertexes 45. The reference surface 50 may then be a horizontal plane, i.e. a plane of constant elevation, at the elevation of the vertexes.

Figure 5:
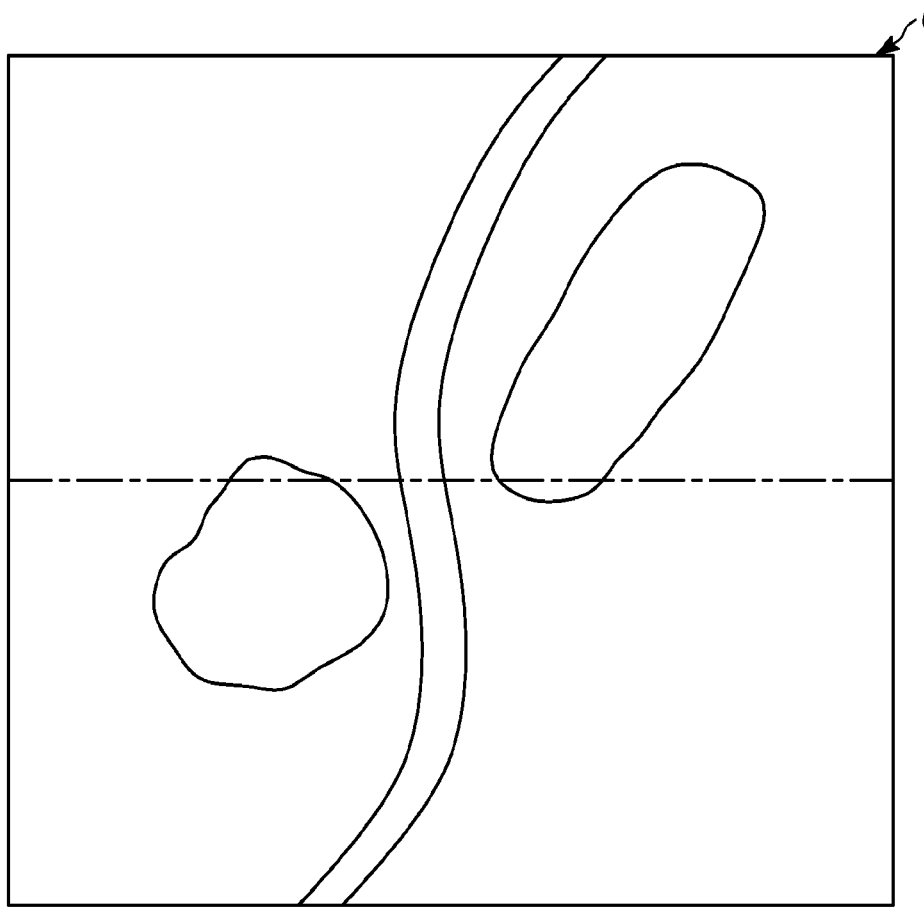
FIG. 5 shows volumes of the objects.
Figure 5:
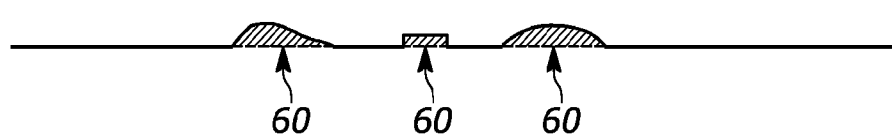

FIG. 5 shows the orthophoto map O and the digital elevation model DEM. FIG. 5 further shows volumes 60 of the parts 30. In FIG. 5, the volumes are indicated by hatching in the DEM. The volumes may be determined based on the polygons 40, the reference surfaces 50 and the digital elevation model DEM. The volumes 60 may be indicated by scalar values, e.g. 600 m$^3$ or, e.g. in case of a known or estimated material, 500 t. The volumes 60 may however also be indicated by shapes, e.g. as 3D-polygons, geometric shapes, vector data, as voxel or by another representation.

Figure 6:
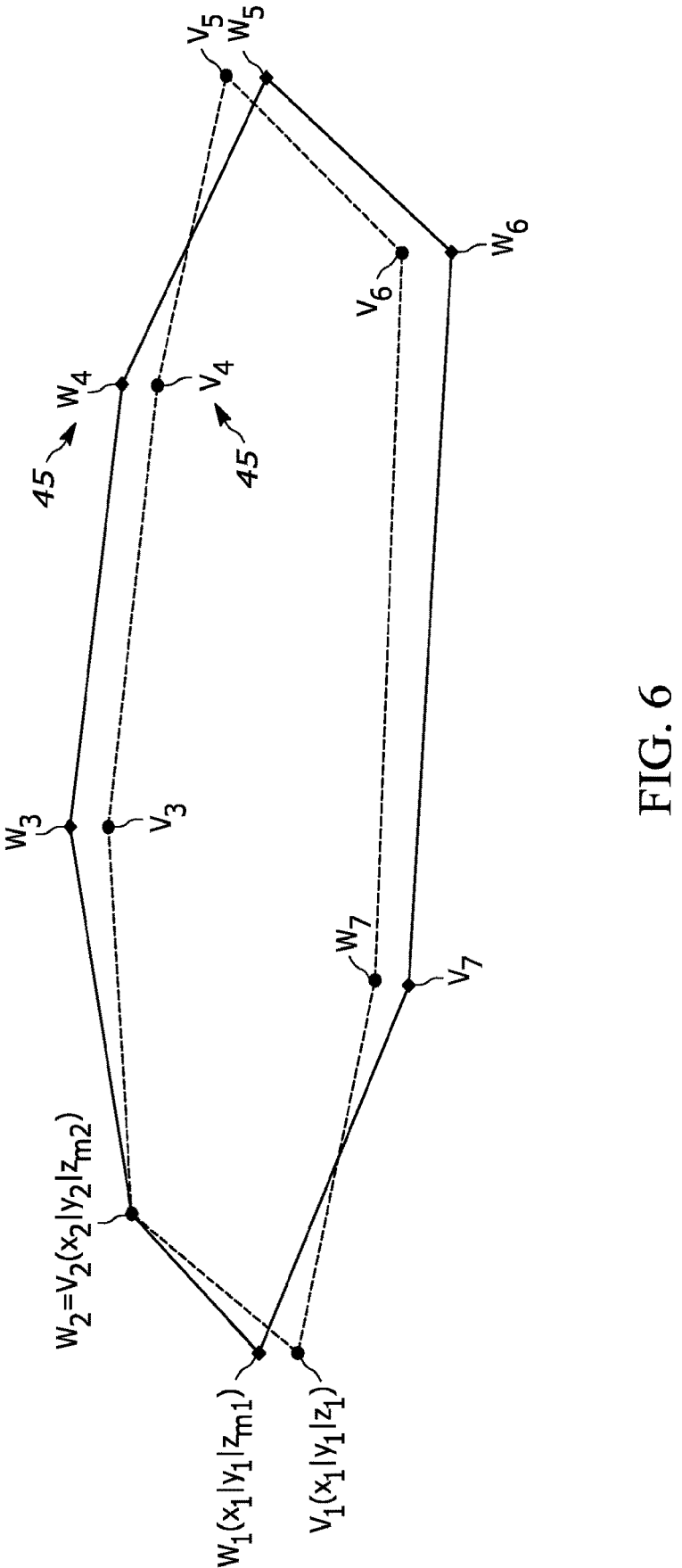
FIG. 6 shows a polygon.

FIG. 6 shows a polygon 40. In the example, the polygon comprises 6 vertexes.

As can be seen, the polygon has been converted: An initial version is indicated by a dashed line, a converted or processed version is indicated by a solid line.

The converted or processed version of the polygon 40 may still comprise a same number of vertexes 45, however, their elevation coordinates may be changed. For example, the elevation coordinates may be converted so that all vertexes lie in a plane, such as the reference surface 50, as discussed above.

Figure 7:
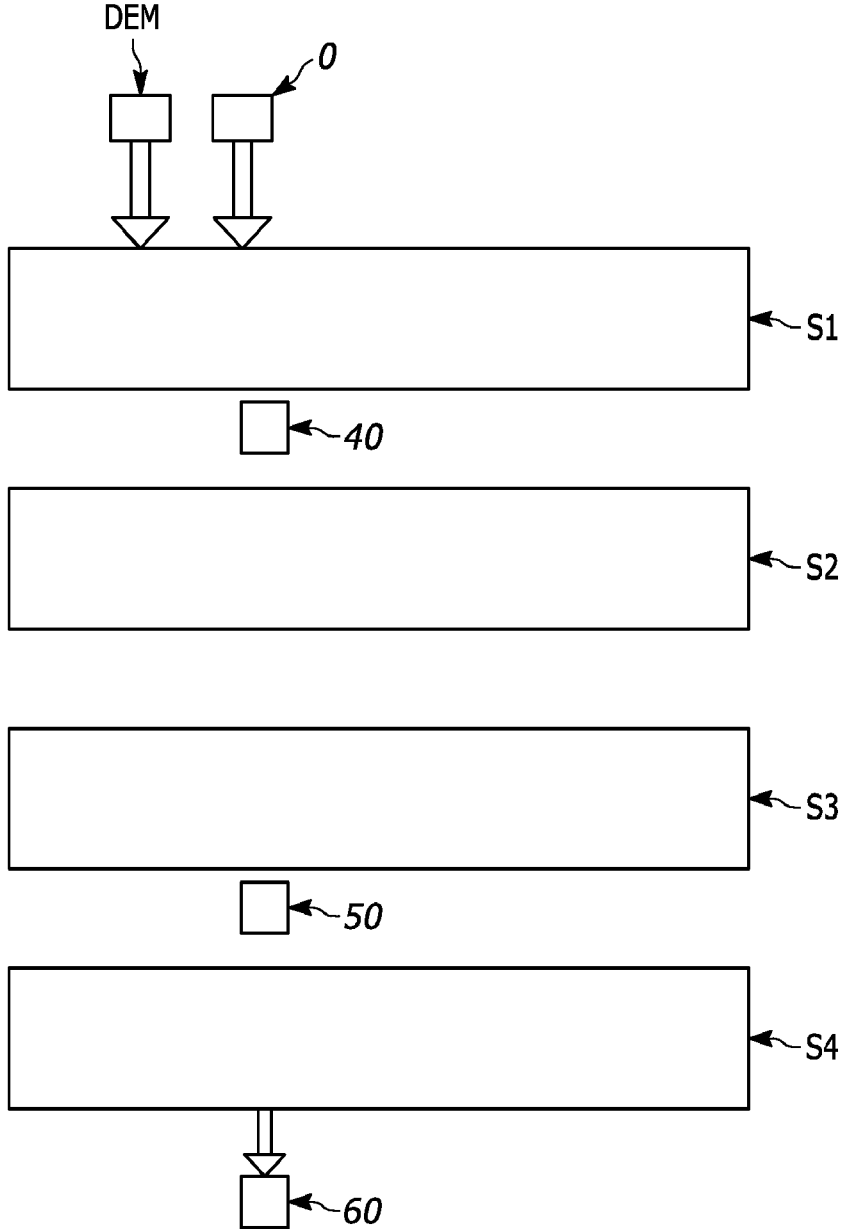
FIGS. 7, 8 & 9 show embodiments of a method.

FIG. 7 shows a method. A system can be configured for performing the method.

The method in FIG. 7 comprises a segmentation step S1, a projection step S2, a reference surface generation step S3 and a volume determining step S4.

The method may comprise processing the orthophoto map O and the digital elevation model DEM. In the segmentation step, the polygons 40 approximating the parts 30 of the area 10 may be generated. The segmentation step may be performed by means of a convolutional neural network. A system may be configured for performing the segmentation step.

The segmentation step may comprise assigning a class to each portion of the orthophoto map O.

Exemplary classes may comprise:
background, i.e. no object of interest,
asphalt,
concrete foundation,
concrete ring,
pipe,
tree,
black or dark sand,
cable well,
cars,
chipping,
container,
dump truck,
heap of earth,
heart of sand,
heavy earth equipment,
lantern,
people,
reinforcement,
rubble,
scaffolding,
silo,
water,
wooden boards,
fence,
pavement,
crushed stone for railways, e.g. for track ballast,
concrete grid,
paving blocks,
aggregate, e.g. for generation of electricity or compressed air,
geotextile,
sheet piling, such as Larssen sheet piling,
artificial rocks,
formwork,
retaining wall,
crane,
steel structure,
wall,
roof, and
floor.

The person skilled in the art will easily understand that, instead of assigning the class "background" to a portion, the method may also comprise not assigning a class to said portion or assigning a "null"-class to a portion.

An input for the convolutional neural network may be image data from the orthophoto map O, e.g. grey scale data, RBG-channel data and/or infrared data. A further input for the convolutional neural network may be data from the digital elevation model DEM. For example, elevation data or data derived thereof, such as a gradient of the elevation, a difference quotient or a difference of elevation at neighbouring pixels may be used as input data for the convolutional neural network.

The projection step may comprise generating 3D-coordinates for the vertexes 45 of the polygons 40.

The projection step may also comprise projecting the vertexes 45 of the polygons 40 on the digital elevation model DEM.

The projection step may alternatively or additionally comprise determining elevation coordinates of the DEM at points corresponding to the vertexes 45 of the polygons 40.

The reference surface generation step may comprise generating the reference surfaces 50 for at least some of the polygons 40.

As discussed above, the reference surface generation step may comprise determining a median, an average or another estimation of the elevation coordinates of the vertexes 45 a polygon 40. The reference surface 50 may then be a horizontal plane, i.e. a plane of constant elevation, at an elevation corresponding to the estimated elevation coordinates. However, there may also be other estimators, e.g. in case of a sloping area 10. Such an estimator may be an inclined plane surface. Such a reference surface can for example be determined by means of an optimizer that minimizes e.g. distances or squares of distances of the vertexes including elevation coordinates from the reference surface.

The volume determining step may comprise for at least some of the polygons 40 determining volumes between a portion of the digital elevation model DEM and a corresponding portion of the respective reference surface 50.

For example, the volume determining step may comprise for the at least some polygons 40 generating a geometric solid of the part 30 approximated by the respective polygon 40. Such a geometric solid could be delimited by the intersection of the polygon 40 with the respective reference surface 50 and the surface defined by the digital elevation model DEM at the corresponding position, e.g. at the same x/y-coordinates.

However, the volume determining step may also just comprise determining a scalar volume corresponding to the part 30 approximated by the respective polygon 40, e.g. by integrating over an elevation difference within the polygon 40 according to the following equation 1.

Below, Equation 1 is provided as an exemplary part of the volume determining step. Equation 1 is to be applied under the assumption that the reference surface 50 and the digital elevation model DEM within a polygon 40 are non-intersecting. In the opposite case, the equation has to be applied separately for parts of the polygon delimited by intersections between the DEM and the reference surface within the polygon.

$$V = |\int_{y_{Pol}} \int_{x_{Pol}(y_{Pol})} z_{DEM}(x,y) - z_{ref}(x,y) dx dy| \qquad \text{Eq. 1}$$

In Equation 1, "Polygon" refers to the x- and y-coordinates of the surface within the polygon. $z_{DEM}$ refers to the elevation or z-coordinate indicated by the digital elevation model DEM at the coordinates x, y. $z_{ref}$ refers to the elevation of the reference surface 50 at the coordinates x, y. $x_{Pol}(y)$ refers to the x-coordinates of the points within the polygon at an indicated y-coordinate. $y_{pol}$ refers to the y-coordinates of the points within the polygon.

Figure 8:
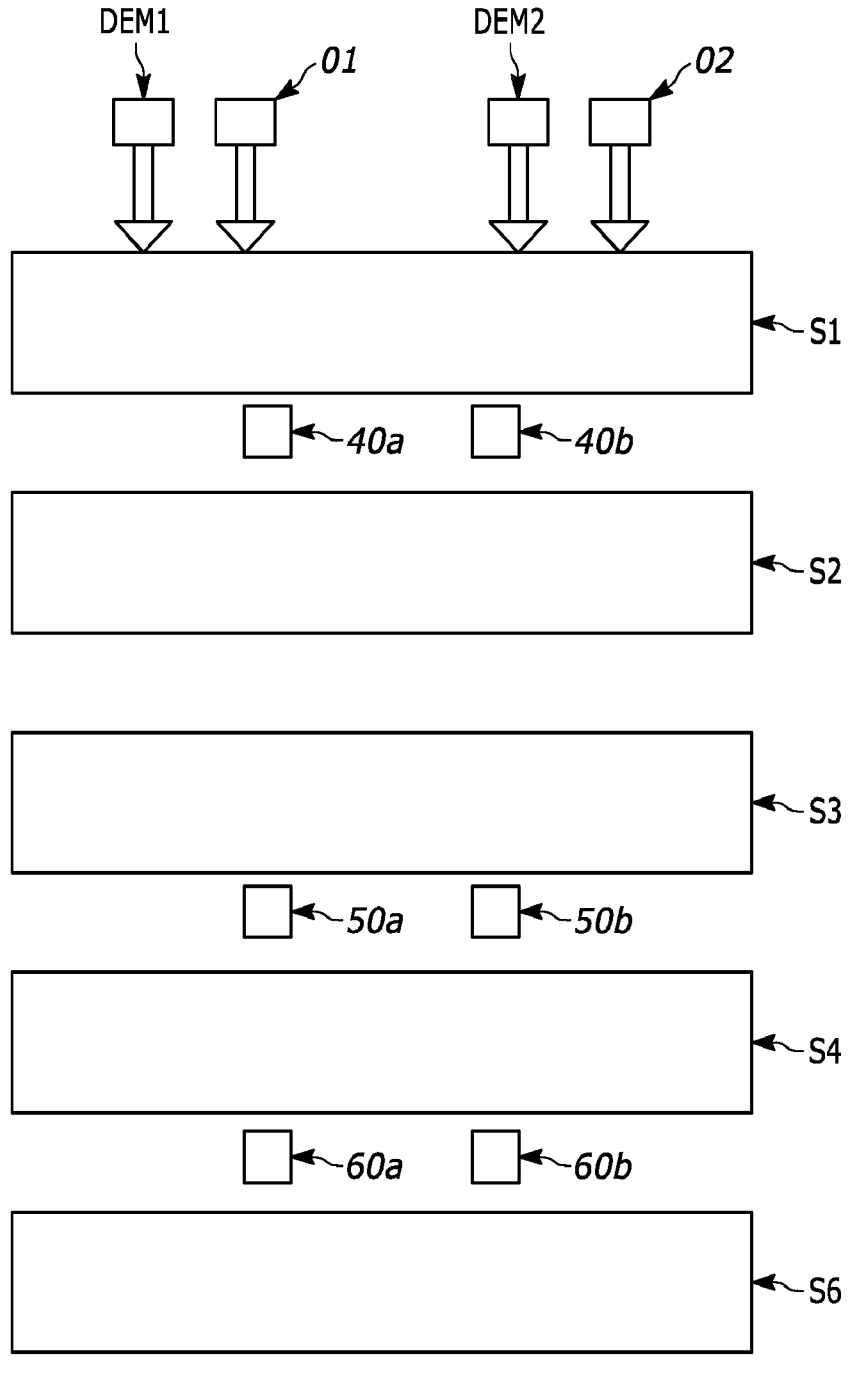

FIG. 8 shows another embodiment of the method. With respect to the embodiment of FIG. 7, the method inter alia further comprises a volume comparison step S6.

Further, the embodiment of the method depicted in FIG. 8 comprises processing two orthophoto maps O1, O2, relating to the same area 10 at different points in time. Further, the method comprises processing two digital elevation models DEM1, DEM2, also relating to the area 10 at different points in time. In an example, the first digital elevation model DEM1 may correspond to the time of the first orthophoto map O1, and the second digital elevation model DEM2 may correspond to the time of the second orthophoto map O2.

The method in FIG. 8 comprises determining a first set of polygons 40a by the above-discussed method based on the first orthophoto map O1 and the first digital elevation model DEM1 as well as a second set of polygons 40b by the above-discussed method based on the second orthophoto map O2 and the second digital elevation model DEM2.

The projection step as well as the reference surface generation step may then be performed for at least some polygons of the first set 40a and the first digital elevation model DEM1, and for at least some polygons the second set 40b of polygons and the second digital elevation model DEM2. Thus, a first set of reference surfaces 50a and a second set of reference surfaces 50b is generated.

In FIG. 8, the volume determining step comprises determining for at least some of the first polygons 40a first volumes 60a between a portion of the first digital elevation model DEM1 and corresponding portions of the respective first reference surfaces 50a as discussed in detail with reference to FIG. 7. In FIG. 8, the volume determining step further comprises determine seconds volumes 60b for at least some of the second polygons 40b between a portion of the second digital elevation model DEM2 and corresponding portions of the respective second reference surfaces 50b.

The method in FIG. 8 further comprises the volume comparison step. The volume comparison step comprises comparing corresponding first and second volumes. Thus, for example a change of a volume of a heap of earth can be detected and the corresponding earth movement can be approximated.

Further, volumes 60 that are present in the first orthophoto map O1 and the first digital elevation model DEM1 but not in the second orthophoto map O2 and the second digital elevation model DEM2 or vice versa can be identified. Thus, e.g. newly built streets or parts of buildings as well as present equipment, e.g. heavy machinery, can be detected.

Figure 9:
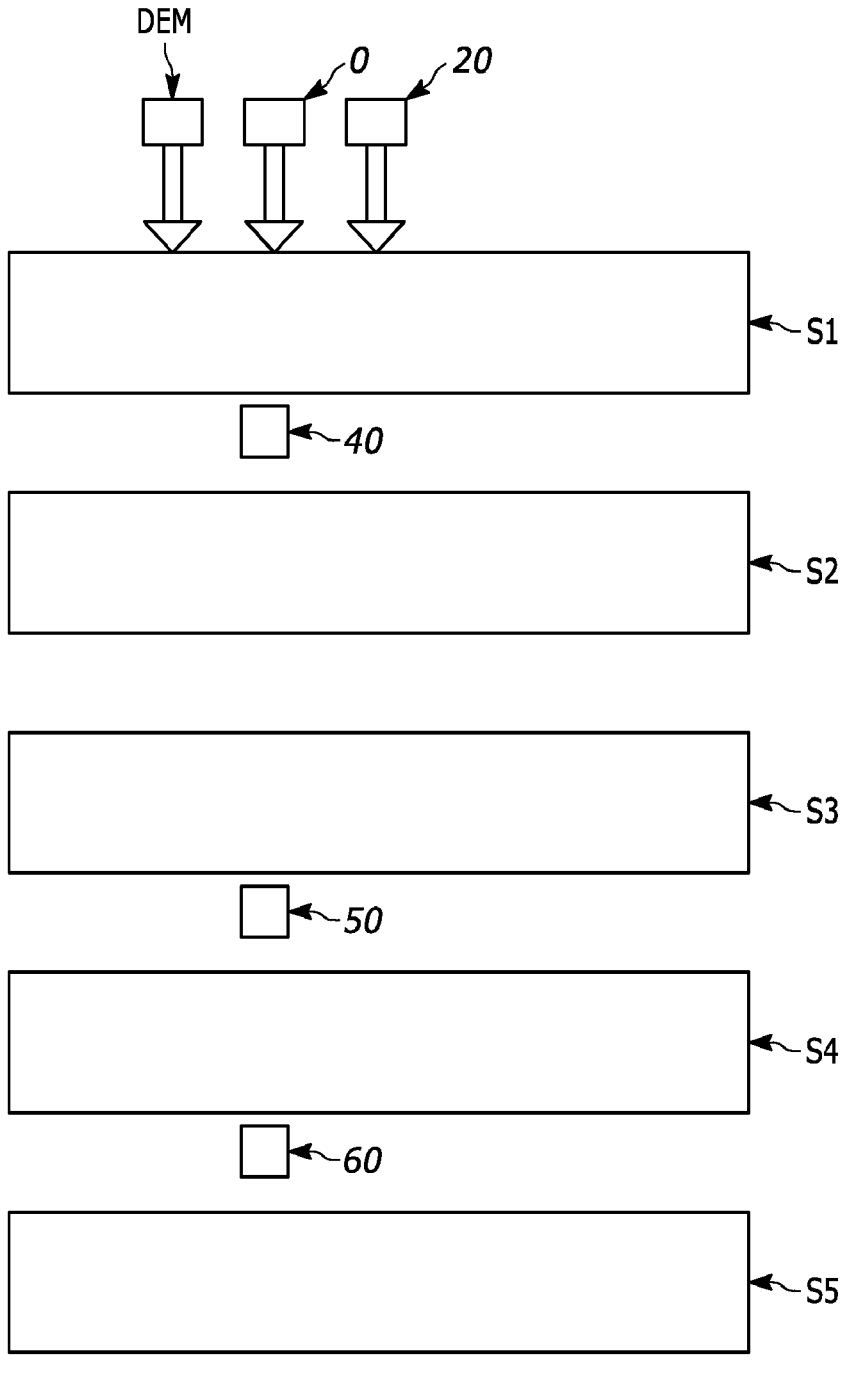

A further embodiment of the method is shown in FIG. 9. With respect to the embodiment of FIG. 7, the method further comprises a data comparison step S5.

The method in FIG. 9 further comprises receiving design data 20. The design data in FIG. 9 relate to the area 10. The design data 20 may for example be data in a CAD-format, such as the Drawing Interchange File Format (.dxf) format of Autodesk, Inc., San Rafael, CA, USA, or the DGN format, supported by MicroStation software of Bentley Systems Incorporated, Exton, PA, USA.

The design data 20 comprise information relating to objects that are to be constructed or to be present in the area 10. These design data 20 can for example be georeferenced, i.e. they may comprise an indication of the geographic locations of the objects specified by the design data 20.

Further, the method may comprise determining geographical positions of the vertexes 45 of the polygons 40 generated based on the orthophoto map O and/or the digital elevation model DEM. Hence, geographic locations of the volumes 60 may be determined.

The data comparison step in FIG. 9 comprises comparing the volumes 60 identified in the area 10 and the objects specified in the design data 20.

This allows to identify deviations between the objects specified by the design data 20 and the parts identified in the area 10.

Thus, optionally advantageously, deviations of positions can be determined.

Further, a progress of a construction site or other earth movement in the area 10 can be determined.

Figure 11:
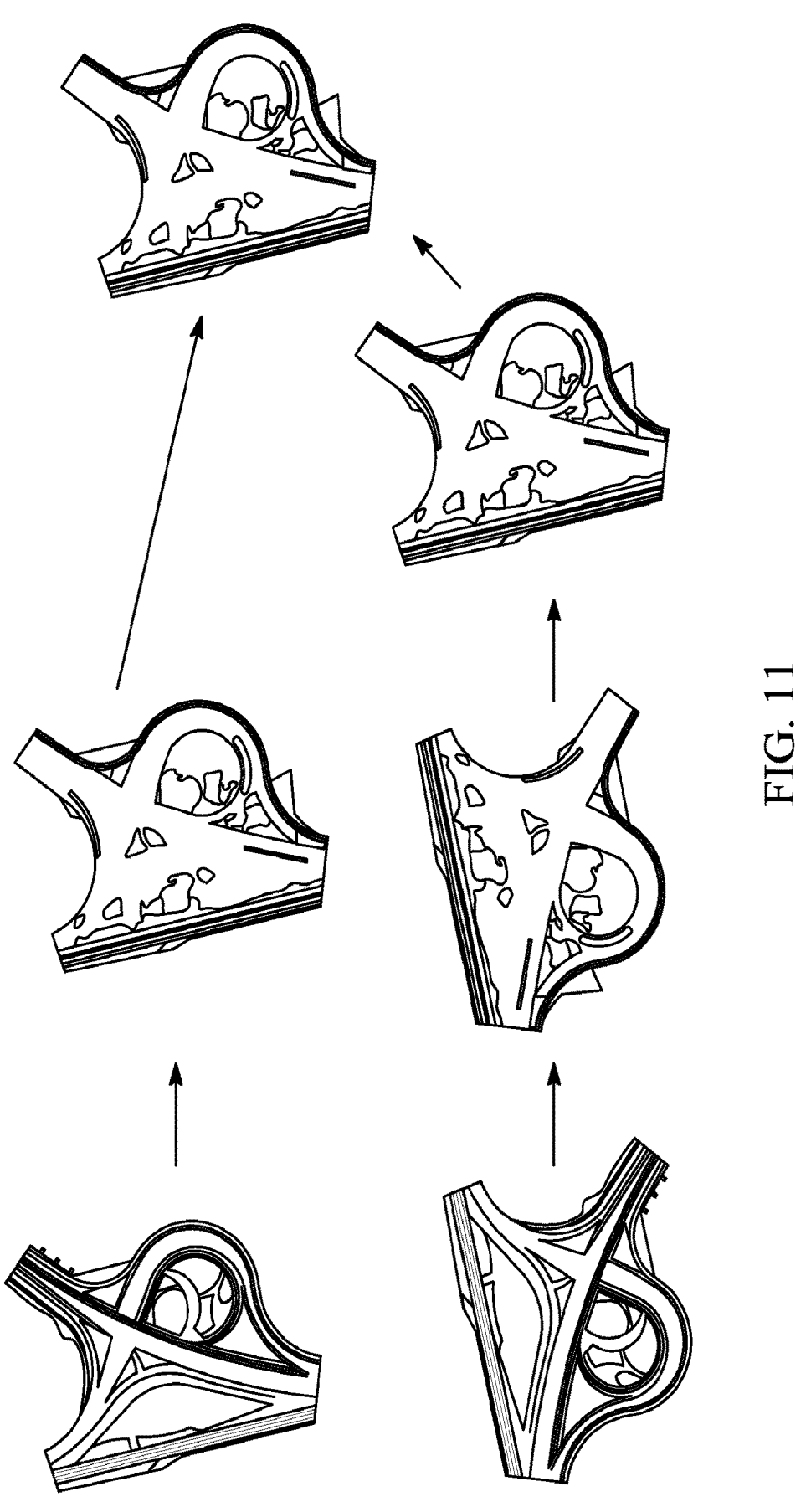
FIG. 11 shows an orthophoto map in different orientations.

FIG. 11 shows different rotations of a section of an orthophoto map. As can be seen, the sections can be rotated e.g. once or several times around 90 degrees. The section can be inputted to the segmentation component/the segmentation step in each generated orientation. For the results, the rotation may then be reversed and the results of the different rotations may be merged. This may be optionally advantageous so as to provide more analysable input data to the segmentation component, particularly to the convolutional neural network. Thus, more parts of the area may be correctly determined.

Figure 12:
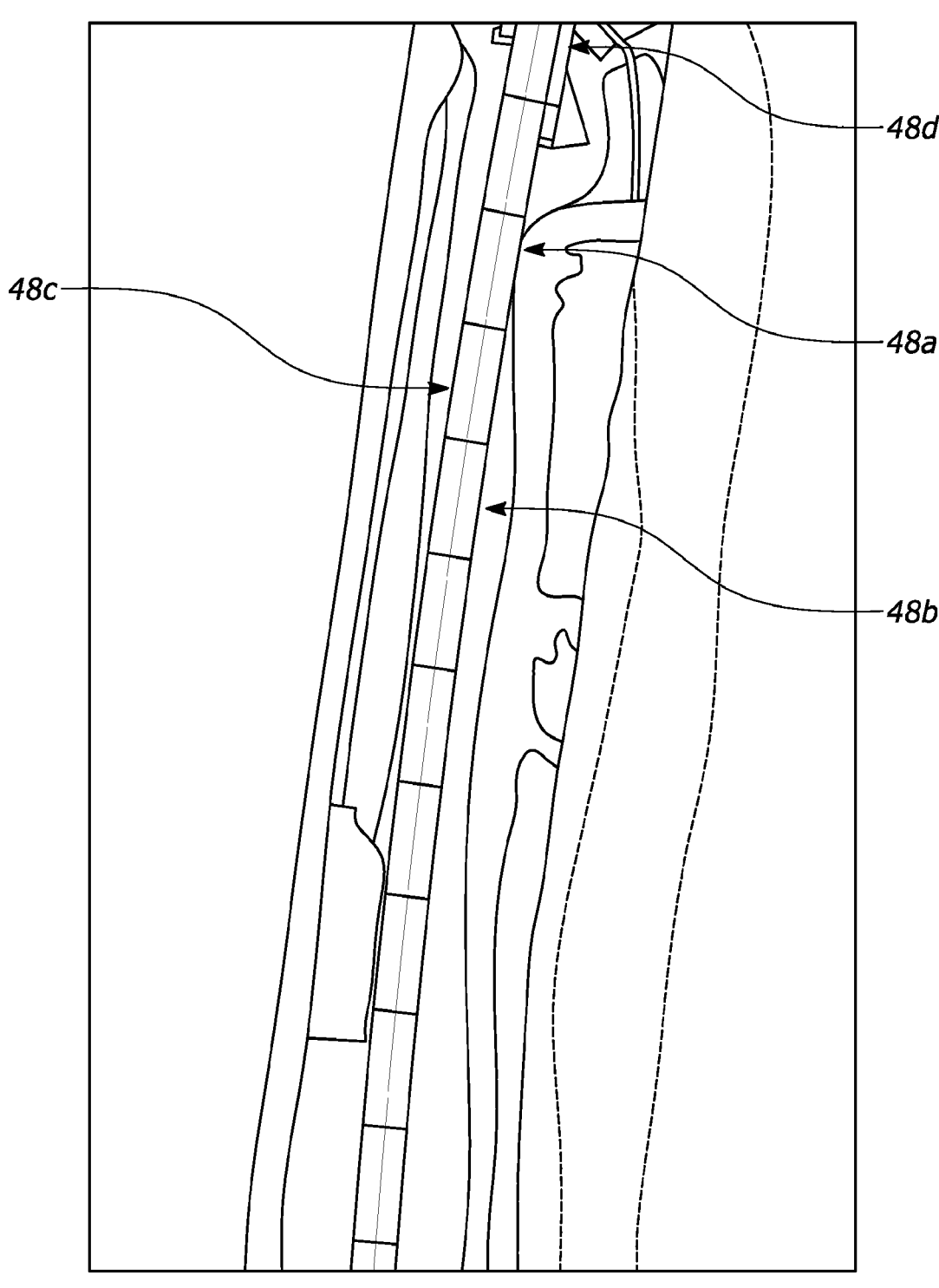
FIGS. 12-14 show reporting units in orthophoto maps of different construction sites.

FIG. 12 shows an example of reporting units 48a, 48b, 48c, 48d in the case of a road construction site. As can be seen, in the example of FIG. 12, the road to be constructed (or refurbished) is divided into several spatial objects, in this case polygons. The reporting units may be used for tracking a progress of the construction, e.g. along a direction of the road. Also, the reporting units may be advantageous for estimating a completion of a certain construction step, e.g. levelling of ground, allowing for subsequent surface construction. Thus, the reporting units may also be suitable for determining whether or when for a respective unit, a next step may be performed.

Figure 13:
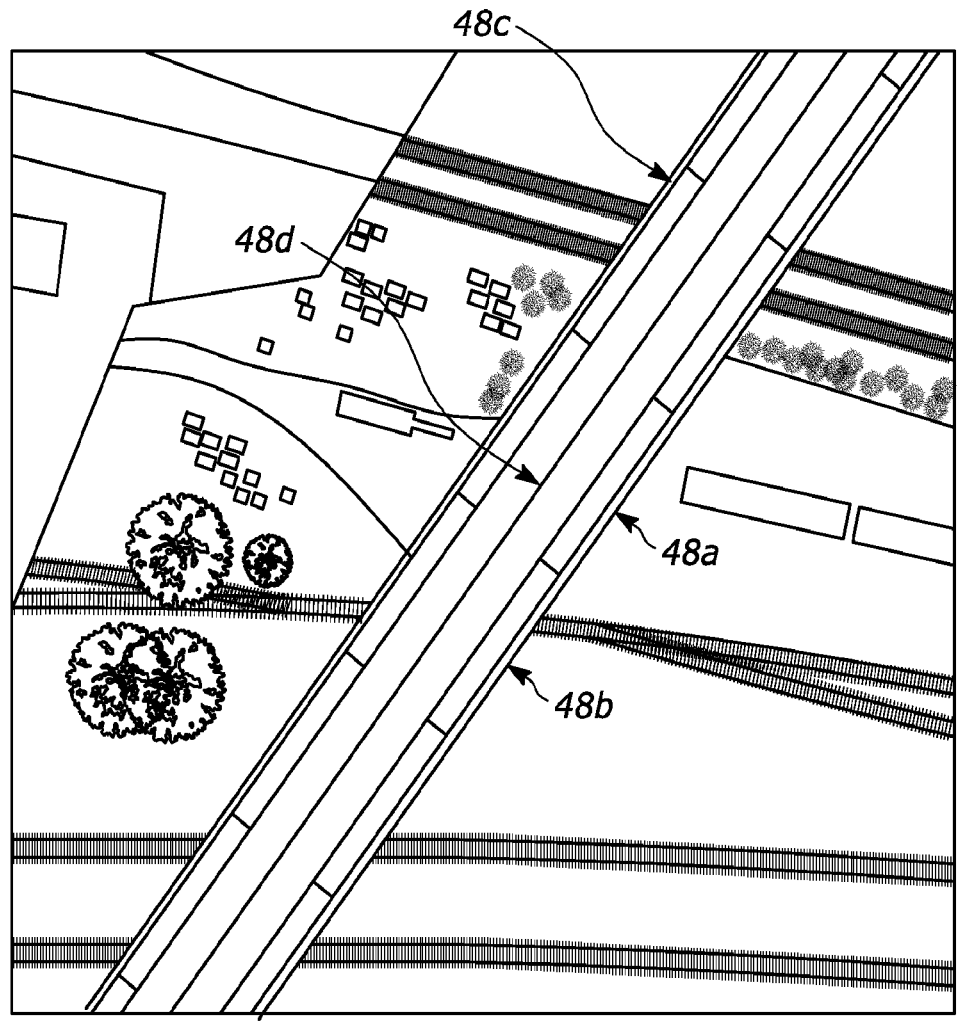

FIG. 13 shows another example of reporting units in case of construction of a bridge.

Figure 14:
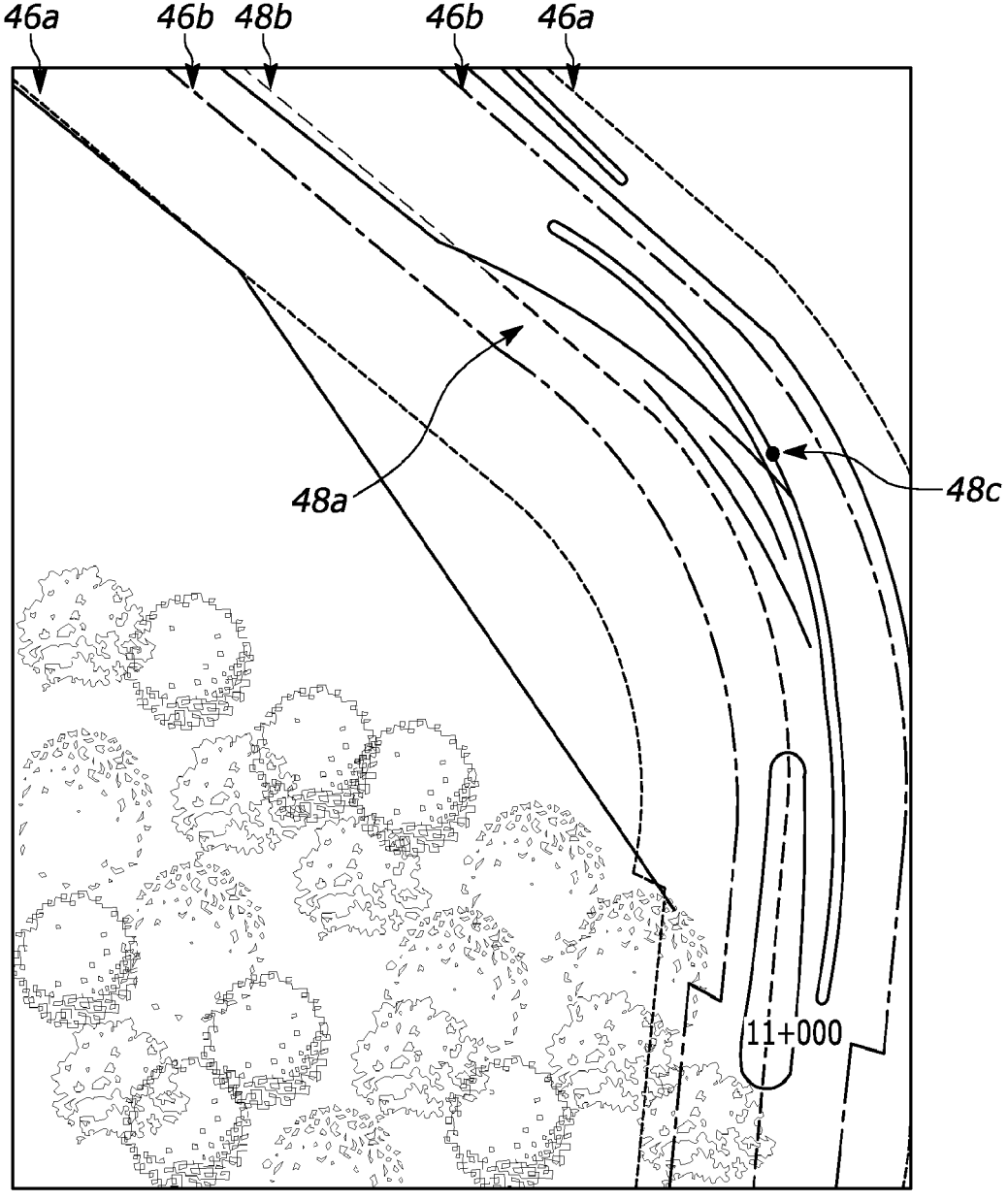

FIG. 14 shows an example of reporting units in the case of a gas pipeline. As can be seen, the reporting units 48a, 48b, and 48c may refer to different steps of the construction site. In the example of FIG. 14, reporting unit 48a corresponds to trenching works: A trench is completed and the previous phases of stringing and bending are also completed, a part of a gas pipe lays on the right side of the trench, ready to be lowered into the trench. In the example of FIG. 14, reporting unit 48b corresponds to further—in the example completed—lowering in works. In other words, the pipe has been lowered into a trenchand the trench is ready to be backfilled. Further relating to the example of FIG. 14, reporting unit 48c corresponds to bending of the pipeline.

For the purpose of illustration, different boundaries of a construction site 46a, 46b are shown in FIG. 14, within which the works need to be performed.

Figure 15:
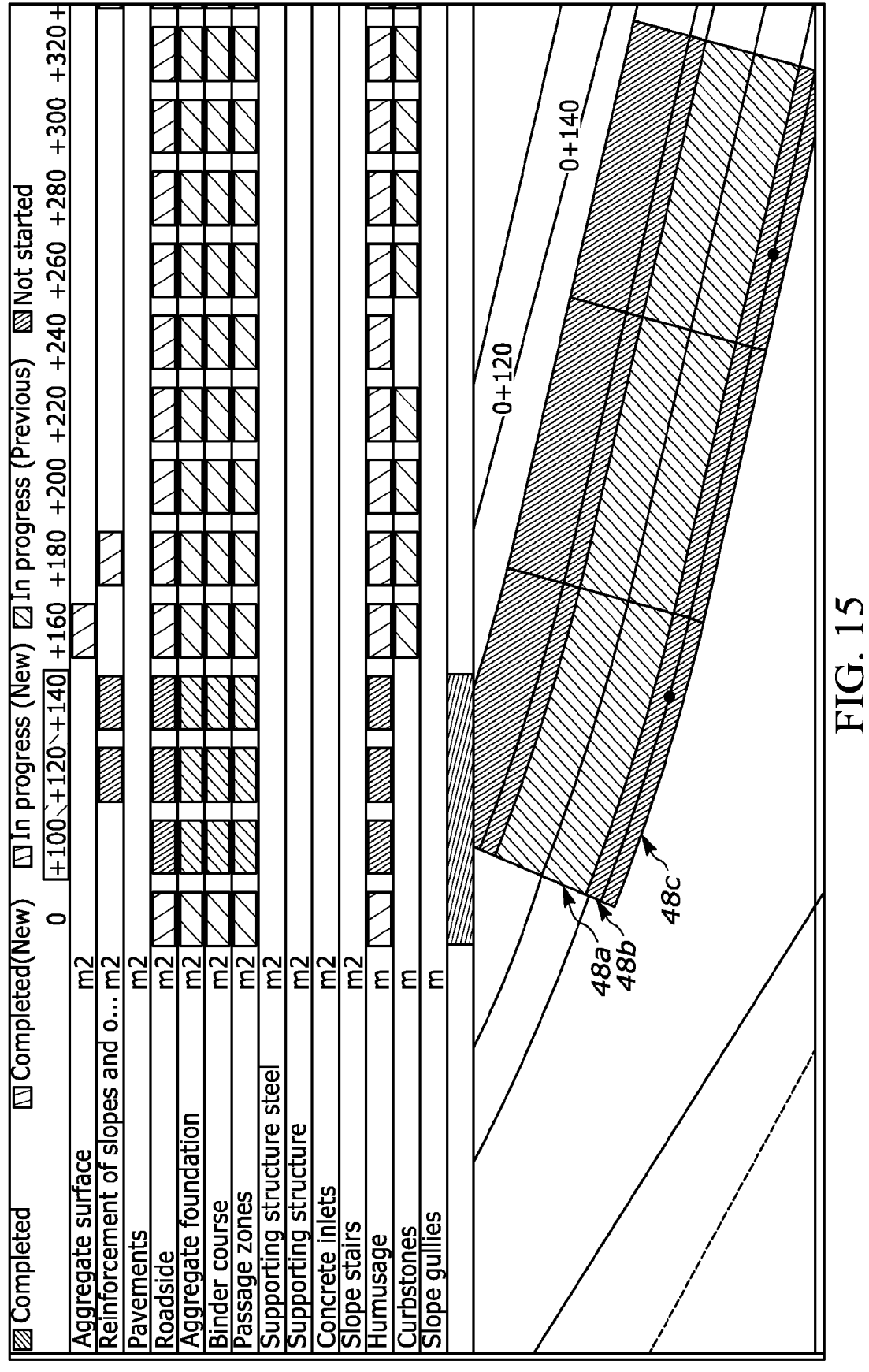
FIG. 15 shows an analysis of progress using reporting units.

FIG. 15 shows an overview of a progress of a road construction. On a lower half of FIG. 15, reporting units 48a, 48b, 48c can be seen. On an upper half of FIG. 15, an analysis of a progress of the construction site based on the reporting units can be seen. As can be seen, the reporting units relate to different spatial parts of the construction site, as well as to different steps in the construction process.

The person skilled in the art will easily understand that, in case of FIGS. 12, 13 and 15, not all reporting units are provided with reference numerals for legibility. Further, the person skilled in the art will easily understand that the shown reporting units in FIGS. 12-15 may be non-exhaustive. In other words, there may be still other reporting units not displayed in the Figures.

Figure 10:
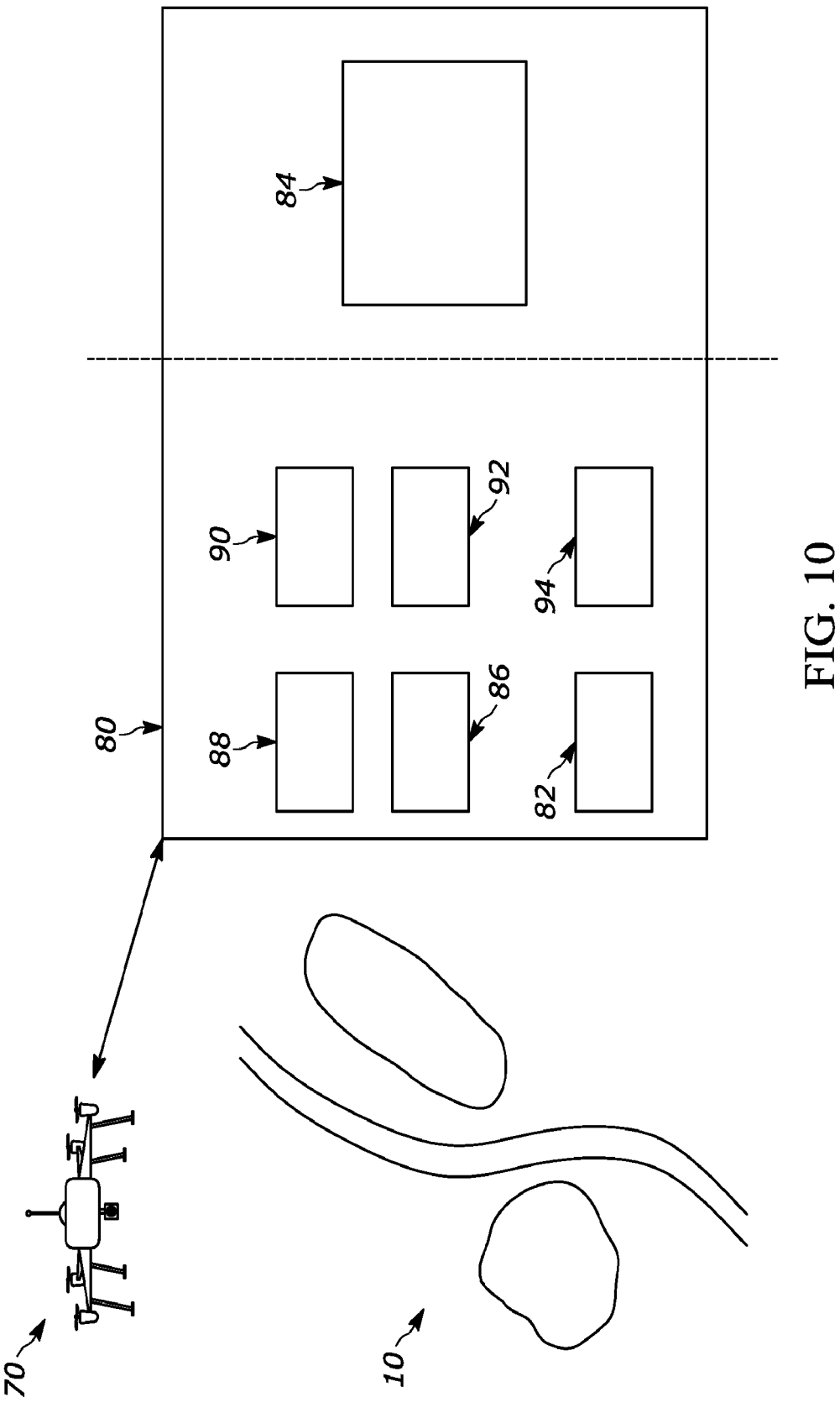
FIG. 10 shows a system configured for performing the method.

FIG. 10 shows a system. The system may be configured for performing the method.

The system comprises a data-processing system 80.

The data processing system 80 may comprise one or more processing units configured to carry out computer instructions of a program (i.e. machine readable and executable instructions). The processing unit(s) may be singular or plural. For example, the data processing system 80 may comprise at least one of CPU, GPU, DSP, APU, ASIC, ASIP or FPGA.

The data processing system 80 may comprise memory components, such as the data storage component 82. The data storage component 82 as well as the data processing system 80 may comprise at least one of main memory (e.g. RAM), cache memory (e.g. SRAM) and/or secondary memory (e.g. HDD, SDD).

The data processing system 80 may comprise volatile and/or non-volatile memory such an SDRAM, DRAM, SRAM, Flash Memory, MRAM, F-RAM, or P-RAM. The data processing system 80 may comprise internal communication interfaces (e.g. busses) configured to facilitate electronic data exchange between components of the data processing system 80, such as, the communication between the memory components and the processing components.

The data processing system 80 may comprise external communication interfaces configured to facilitate electronic data exchange between the data processing system and devices or networks external to the data processing system, e.g. for receiving data from the unmanned aerial vehicle 70.

For example, the data processing system may comprise network interface card(s) that may be configured to connect the data processing system to a network, such as, to the Internet. The data processing system may be configured to transfer electronic data using a standardized communication protocol. The data processing system may be a centralized or distributed computing system.

The data processing system may comprise user interfaces, such as an output user interface and/or an input user interface. For example, the output user interface may comprise screens and/or monitors configured to display visual data (e.g. an orthophoto map (O) of the area 10) or speakers configured to communicate audio data (e.g. playing audio data to the user). The input user interface may e.g. a keyboard configured to allow the insertion of text and/or other keyboard commands (e.g. allowing the user to enter instructions to the unmanned aerial vehicle or parameters for the method) and/or a trackpad, mouse, touchscreen and/or joystick, e.g. configured for navigating the orthophoto map O or objects identified in the orthophoto map.

To put it simply, the data processing system 80 may be a processing unit configured to carry out instructions of a program. The data processing system 80 may be a system-on-chip comprising processing units, memory components and busses. The data processing system 80 may be a personal computer, a laptop, a pocket computer, a smartphone, a tablet computer. The data processing system may comprise a server, a server system, a portion of a cloud computing system or a system emulating a server, such as a server system with an appropriate software for running a virtual machine. The data processing system may be a processing unit or a system-on-chip that may be interfaced with a personal computer, a laptop, a pocket computer, a smartphone, a tablet computer and/or user interfaces (such as the upper-mentioned user interfaces).

In the example of FIG. 10, the data-processing system comprises a portion located in a cloud system (the segmentation component 84 comprising the convolutional neural network—shown on the right of the dashed line in FIG. 10) and a portion located on a computer system, such as a server (shown on the left of the dashed line in FIG. 10). This may be optionally advantageous, as training and evaluating a neural network may be particularly demanding in terms of computing power. This computing power may be provided efficiently by means of a cloud-computing system.

In the example of FIG. 10, the data-processing system comprises a segmentation component 84 configured for performing the semantic segmentation step.

In other words, the data processing system 80 may comprise an segmentation component 84. More particularly, the data processing system 80 may comprise at least one storage device wherein the data processing system 80 may be stored.

The segmentation component 84 may be implemented in software. Thus, the segmentation component 84 may be a software component, or at least a portion of one or more software components. The data processing system 80 may be configured for running said software component, and/or for running a software comprising this software component. In other words, the segmentation component 84 may comprise one or more computer instructions (i.e. machine-readable instructions) which may be executed by a computer (e.g. the data processing system 80).

The segmentation component 84 may be stored on one or more different storage devices. For example, the segmentation component 84 may be stored on a plurality of storage components comprising persistent memory, for example a plurality of storage devices in a RAID-system, or different types of memory, such as persistent memory (e.g. HDD, SDD, flash memory) and main memory (e.g. RAM).

The segmentation component 84 may also be implemented at least partially in hardware. For example, the segmentation component 84 or at least a portion of the segmentation component 84 may be implemented as a programmed and/or customized processing unit, hardware accelerator, or a system-on-chip that may be interfaced with the data processing system 80, a personal computer, a laptop, a pocket computer, a smartphone, a tablet computer and/or a server.

The segmentation component 84 may also comprise elements implemented in hardware and elements implemented in software. An example may be a use of a hardware-implemented encryption/decryption unit and a software implemented processing of the decrypted data.

The segmentation component 84 may comprise elements specific to the data processing system 80, for example relating to an operating system, other components of the data processing system 80, or the unmanned aerial vehicle 70 to which the data processing system 80 may be connected.

Further, data processing system 80 may comprise a projection component 86. The projection component may be configured for performing the projection step and the reference surface generation step. More particularly, the data processing system 80 may comprise at least one storage device wherein the projection component 86 may be stored.

The data processing system 80 may comprise a volume determining component 88. The volume determining component 88 may be configured for performing the volume determining step.

Also, the data processing system 80 may comprise a pre-processing component 90. The pre-processing component 90 may be configured for performing the pre-processing step.

The data processing system 80 may comprise a post-processing component 92. The post-processing component 92 may be configured for performing the post-processing step.

Further, the data processing system 80 may comprise an area-comparison component 94. The area-comparison component 94 may be configured for performing the data comparison step.

The data processing system 80 may comprise at least one storage device wherein at least one of the projection component 86, the volume determining component 88, the pre-processing component 90, the post-processing component 92 and the area-comparison component 94 may be stored, such as the data-storage component 82.

At least one of the projection component 86, the volume determining component 88, the pre-processing component 90, the post-processing component 92 and the area-comparison component 94 may be implemented in software. One, some or all of these components may be a software components, or at least a portion of one or more software components. The data processing system 80 may be configured for running said software components, and/or for running a software comprising the software components. In other words, the components may comprise one or more computer instructions (i.e. machine readable instructions) which may be executed by a computer (e.g. the data processing system 80).

At least one of the projection component 86, the volume determining component 88, the pre-processing component 90, the post-processing component 92 and the area-comparison component 94 may be stored on one or more different storage devices. For example, the at least one of the components may be stored on a plurality of storage components comprising persistent memory, for example a plurality of storage devices in a RAID-system, or different types of memory, such as persistent memory (e.g. HDD, SDD, flash memory) and main memory (e.g. RAM).

The components may also be implemented at least partially in hardware. For example, at least one of the projection component 86, the volume determining component 88, the pre-processing component 90, the post-processing component 92 and the area-comparison component 94 or at a part of one of their functionalities may be implemented as a programmed and/or customized processing unit, hardware accelerator, or a system-on-chip that may be interfaced with the data processing system 80, a personal computer, a laptop, a pocket computer, a smartphone, a tablet computer and/or a server.

While in the above, a preferred embodiment has been described with reference to the accompanying drawings, the skilled person will understand that this embodiment was provided for illustrative purpose only and should by no means be construed to limit the scope of the present invention, which is defined by the claims.

Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be accidental. That is, unless otherwise specified or unless clear to the skilled person, the order in which steps are recited may be accidental. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

REFERENCE SIGNS

O orthophoto map
O1 first orthophoto map
O2 second orthophoto map
DEM digital elevation model
DEM1 first digital elevation model
DEM2 second digital elevation model
10 area
20 design data
30 part
40 polygon
45 vertex of the polygon
46*a,b* boundaries
48*a-d* reporting units
50 reference surface
60 volume
70 unmanned aerial vehicle
80 data-processing system
82 data-storage component
84 segmentation component
86 projection component
88 volume determining component
90 pre-processing component
92 post-processing component
94 area-comparison component
S1 Segmentation step
S2 Projection step
S3 Reference surface generation step
S4 Volume determining step
S5 Data comparison step
S6 Volume comparison step

The invention claimed is:

1. A system comprising a data-processing system,
   wherein the data-processing system comprises a data-storage component, wherein the data-storage component is configured for providing an input orthophoto map and an input digital elevation model of the area,
   wherein the data-processing system further comprises a segmentation component, wherein the segmentation component is configured for generating polygon(s) based on the input orthophoto map, each polygon approximating a part of the input orthophoto map,
   wherein the data-processing system comprises a projection component, wherein the projection component is configured for projecting the polygon(s) on the input digital elevation model of the area and for generating a reference surface for each of the at least some of the polygon(s),
   wherein the data-processing system comprises a pre-processing component,
   wherein the pre-processing component is configured for determining at least a component of a gradient of the input digital elevation model, and the segmentation component is configured for determining the parts of the input orthophoto map based at least on the input orthophoto map and the component(s) of the gradient of the input digital elevation model, and wherein the pre-processing component is configured for generating tiles of the input orthophoto map and the digital elevation model, and wherein the segmentation component is configured for processing at least some of the tiles individually.

2. The system according to claim 1, wherein the data-processing system comprises a volume determining component configured for determining a volume between a portion of the input digital elevation model and a portion of the reference surface for each reference surface.

3. The system according to claim 2, wherein the segmentation component and the projection component are configured for processing the first orthophoto map as input orthophoto map and the first digital elevation model as input digital elevation model, the segmentation component being configured for thus generating first polygon(s) and the projection component being configured for thus generating first reference surface(s); and the second orthophoto map as input orthophoto map and the second digital elevation model as input digital elevation model, the segmentation component being configured for thus generating second polygon(s) and the projection component being configured for thus generating second reference surface(s), wherein the volume determining component is configured for processing the first reference surface(s) and the first digital elevation model and thus generating first volume(s), and for processing the second reference surface(s) and the second digital elevation model and thus generating second volume(s), and wherein the volume determining component is configured for comparing at least some of the first and second volume(s).

4. The system according to claim 3, the volume determining component is configured for at least one of determining volume differences between at least some of the first and the second volume(s), and determining volumes that are present in only one of the first and the second volume(s).

5. The system according to claim 1, wherein the projection component is configured for processing elevation coordinates of the vertexes of the at least some polygon(s) projected to the input digital elevation model, wherein processing the elevation coordinates of the vertexes comprises generating a statistic measure of the elevation coordinates.

6. The system according to claim 1, wherein the segmentation component is configured for determining the parts of the orthophoto map by means of at least one convolutional neural network.

7. The system according to claim 6, wherein the segmentation component is configured for assigning different classes to different portions of the orthophoto map and for assigning portions comprising same classes to groups, wherein the data-processing system comprises a post-processing component, and wherein the post-processing component is configured for applying a conditional random fields algorithm to borders of the groups.

8. The system according to claim 1, wherein the data-storage component is further configured for providing design data, wherein the data-processing system further comprises an area-comparison component, wherein the area-comparison component is configured for at least one of comparing the polygon(s) and the design data, and generating reporting units based on the design data, wherein generating the reporting units comprises dividing at least one object represented by the design data into a plurality of reporting units spatially different from each other.

9. A non-transitory computer-readable storage medium storing instructions that, when executed by one or more processors of the data-processing system of claim 1, cause the one or more processors to perform the steps for which the data-processing system is configured.

10. A method, comprising providing an input orthophoto map of an area, providing an input digital elevation model of the area, performing a segmentation step, wherein the segmentation step comprises generating at least one or a plurality of polygon(s) based on the input orthophoto map, each polygon approximating a part of the input orthophoto map, performing a projection step, the projection step comprising projecting the polygon(s) on the input digital elevation model of the area, and a reference surface generation step, the reference surface generation step comprising generating a reference surface for each of at least some of the polygon(s), wherein the segmentation step comprises generating the polygon(s) based on the input orthophoto map and the input digital elevation model, wherein the semantic segmentation step comprises a pre-processing step, the pre-processing step comprising determining at least a component of a gradient of the input digital elevation model, and wherein the segmentation step comprises determining the parts of the input orthophoto map by means of at least one convolutional neural network based at least on the input orthophoto map and the component(s) of the gradient of the input digital elevation model.

11. The method according to claim 10, wherein the method further comprises a volume determining step, the volume determining step comprising for each reference surface determining a volume between a portion of the input digital elevation model and a portion of the reference surface, wherein the segmentation step comprises determining the parts of the orthophoto map by means of at least one convolutional neural network.

12. The method according to claim 10, wherein the pre-processing step comprises generating tiles of the input orthophoto map and the digital elevation model, wherein the segmentation step comprises assigning different classes to different portions of the orthophoto map by the at least one convolutional neural network, and wherein the method comprises processing at least some tiles individually by means of the at least one convolutional neural network, wherein the segmentation step comprises a post-processing step, wherein the post-processing step comprises applying a conditional random fields algorithm to borders of the groups.

13. The method according to claim 10, wherein the method comprises a data comparison step, wherein the data comparison step comprises at least one of comparing the polygon(s) and the design data, and generating reporting units based on the design data, wherein generating the reporting units comprises dividing at least one object represented by the design data into a plurality of reporting units spatially different from each other.

* * * * *